US011910417B2

(12) United States Patent
Liu et al.

(10) Patent No.: US 11,910,417 B2
(45) Date of Patent: Feb. 20, 2024

(54) BASE STATION DEVICE, TERMINAL DEVICE, AND COMMUNICATION METHOD

(71) Applicants: SHARP KABUSHIKI KAISHA, Sakai (JP); FG Innovation Company Limited, Tuen Mun (HK)

(72) Inventors: Liqing Liu, Sakai (JP); Shohei Yamada, Sakai (JP); Hiroki Takahashi, Sakai (JP); Masayuki Hoshino, Sakai (JP); Hidekazu Tsuboi, Sakai (JP)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 496 days.

(21) Appl. No.: 17/264,767

(22) PCT Filed: Jul. 26, 2019

(86) PCT No.: PCT/JP2019/029483
§ 371 (c)(1),
(2) Date: Mar. 26, 2021

(87) PCT Pub. No.: WO2020/026988
PCT Pub. Date: Feb. 6, 2020

(65) Prior Publication Data
US 2021/0298029 A1 Sep. 23, 2021

(30) Foreign Application Priority Data
Jul. 31, 2018 (JP) ................................. 2018-143408

(51) Int. Cl.
*H04W 72/53* (2023.01)
*H04W 72/0453* (2023.01)
*H04W 72/23* (2023.01)

(52) U.S. Cl.
CPC ....... *H04W 72/53* (2023.01); *H04W 72/0453* (2013.01); *H04W 72/23* (2023.01)

(58) Field of Classification Search
CPC . H04W 72/53; H04W 72/0453; H04W 72/23; H04W 48/12; H04L 5/001;
(Continued)

(56) References Cited

U.S. PATENT DOCUMENTS

2018/0183551 A1 6/2018 Chou et al.
2020/0252180 A1* 8/2020 Takeda .................. H04W 72/12
(Continued)

FOREIGN PATENT DOCUMENTS

CN 103427970 A 12/2013
CN 108024365 A 5/2018
(Continued)

OTHER PUBLICATIONS

NTT DOCOMO, "Revision of SI: Study on New Radio Access Technology", RP-161214, Busan, Korea, Jun. 13-16, 2016.
(Continued)

*Primary Examiner* — Kibrom T Hailu
(74) *Attorney, Agent, or Firm* — ScienBiziP, P.C.

(57) ABSTRACT

A terminal apparatus of the present invention receives setting of an initial DL BWP by using an RRC message, the setting of the initial DL BWP comprises setting a first parameter and a second parameter of a CORESET #0, a value of an identifier of the CORESET #0 is 0, the first parameter represents the size of the CORESET #0, and the second parameter represents the size of the initial DL BWP. The terminal apparatus of the present invention receives a DCI format that schedules a PDSCH in an active DL BWP, and identifies, based on a field in the DCI format, a resource block set to which the PDSCH is allocated. A value of the field is determined based on the size of the DL BWP, the start
(Continued)

resource block, and the number of consecutively allocated resource blocks. The size of the DCI format in a USS is determined based on the size of the CORESET #0, and when the field is applied to the active DL BWP, the size of the DL BWP is the size of the CORESET #0.

12 Claims, 11 Drawing Sheets

(58) Field of Classification Search
CPC . H04L 5/0053; H04L 5/0044; H04L 27/2602; H04L 5/0094
See application file for complete search history.

(56) References Cited

U.S. PATENT DOCUMENTS

| | | | | |
|---|---|---|---|---|
| 2021/0099902 | A1* | 4/2021 | Takeda | H04W 24/10 |
| 2021/0227515 | A1* | 7/2021 | Takahashi | H04L 27/2601 |
| 2021/0336758 | A1* | 10/2021 | Song | H04L 5/1469 |
| 2023/0139455 | A1* | 5/2023 | Chatterjee | H04W 72/23 370/329 |

FOREIGN PATENT DOCUMENTS

| | | |
|---|---|---|
| CN | 108282323 A | 7/2018 |
| EP | 3826408 | 5/2021 |
| WO | 2018106043 A1 | 6/2018 |

OTHER PUBLICATIONS

3rd Generation Partnership Project; Technical Specification Group Radio Access Network; NR; Radio Resource Control (RRC) protocol specification (Release 15), 3GPP TS 38. 331 vol. 15.2.1 (Jun. 2018), Jun. 2018, pp. 61-64, 68-71, 74-76, 82-84, 105-106, 136-138, 202-206.

Huawei, Hisilicon, Remaining issues on DCI contents and format [online], 3GPP TSG RAN WGI #93 RI-1 805882, May 21, 2018, sections 1, 2.

CATT, Corrections on carrier aggregation and bandwidth part operation[online], 3GPP TSG RAN WGI #94 RI-1808381, Aug. 2018.

Sharp, Remaining issues on BWP[online], 3GPP TSG RAN WGI #94b RI-1811144, Oct. 2018.

Huawei,Hisilicon,"Remaining issues on DCI contents and formats",3GPP TSG RAN WG1 Meeting#92bis Sanya,China,Apr. 16-20, 2018,R1-1803707,sections 1-3.

Samsung,"DCI Contents and Formats",3GPP TSG RAN WG1 Meeting #92bis Sanya,China,Apr. 16-20, 2018,R1-1804372,sections 1-3.

Nokia,Nokia Shanghai Bell,"On the remaining issues for DCI format sizes and contents",R1-1806657,3GPP TSG RAN WG1 Meeting#93,Busan,Republic of Korea,May 21-25, 2018,sections 1-4.

Mediatek Inc.,"Remaining issues on DCI Contents and Formats",R1-1804045,3GPP TSG RAN WG1 Meeting#92bis,Sanya,China,Apr. 16-20, 2018,sections 1-5.

Nokia, Nokia Shanghai Bell, "On the alignment of DCI format sizes", R1-1804614, 3GPP TSG RAN WG1 Meeting #92bis, Sanya, China, Apr. 16-Apr. 20, 2018(Apr. 7, 2018).

Fujitsu, "Frequency domain field interpretation for fallback DCI in DL", R1-1803941, 3GPP TSG RSN WG1 Meeting #92bis, Sanya, China, Apr. 16-20, 2018(Apr. 7, 2018).

* cited by examiner

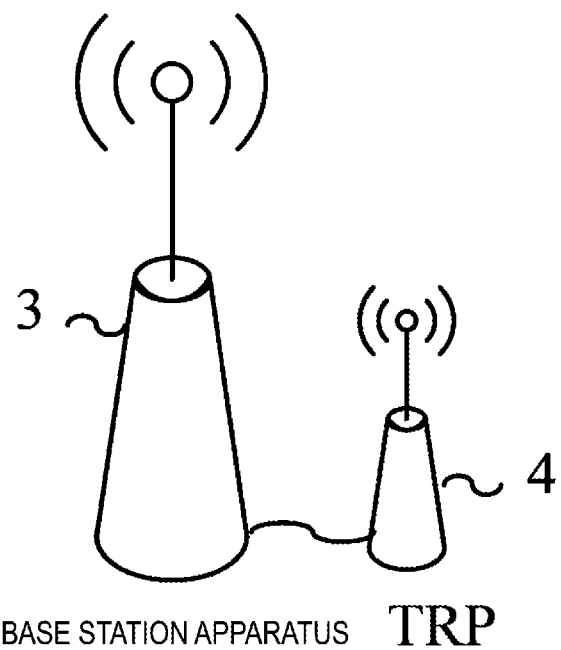
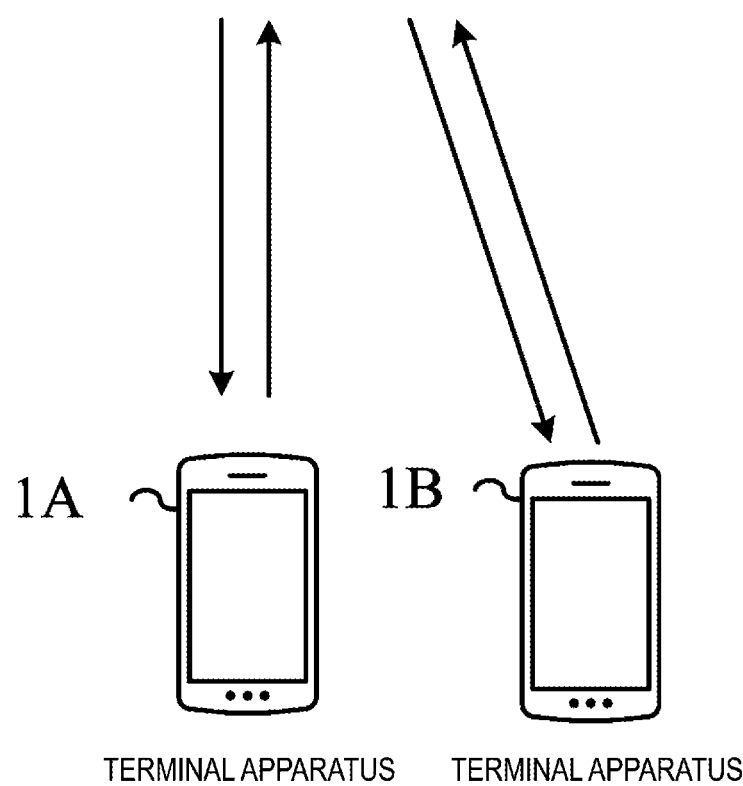
FIG. 1

(A)

IF $(L_{RBs} - 1) \leq \lfloor N_{BWP}^{size}/2 \rfloor$, $RIV = N_{BWP}^{size}(L_{RBs} - 1) + RB_{start}$

OR $RIV = N_{BWP}^{size}(N_{BWP}^{size} - L_{RBs} + 1) + (N_{BWP}^{size} - 1 - RB_{start})$ WHEREIN, $L_{RBs} \geq 1$ AND DOES NOT EXCEED $N_{BWP}^{psize} - RB_{start}$.

(B)

IF $(L'_{RBs} - 1) \leq \lfloor N_{BWP}^{initial}/2 \rfloor$, $RIV = N_{BWP}^{initial}(L'_{RBs} - 1) + RB'_{start}$

OR $RIV = N_{BWP}^{initial}(N_{BWP}^{initial} - L'_{RBs} + 1) + (N_{BWP}^{initial} - 1 - RB'_{start})$ WHEREIN, $L'_{RBs} = L_{RBs}/K$, $RB'_{start} = RB_{start}/K$ AND $L'_{RBs}$ DOES NOT EXCEED $N_{BWP}^{initial} - RB'_{start}$.

IF $N_{BWP}^{active} > N_{BWP}^{initial}$, K IS THE MAXIMUM VALUE MEETING $K \leq \lfloor N_{BWP}^{active}/N_{BWP}^{initial} \rfloor$ IN A SET {1, 2, 4, 8}; OTHERWISE, K=1.

FIG. 9

BASE STATION DEVICE, TERMINAL DEVICE, AND COMMUNICATION METHOD

TECHNICAL FIELD

The present invention relates to a base station apparatus, a terminal apparatus, and a communication method. The present application claims priority to Japanese Patent Application No. 2018-143408 filed in Japan on Jul. 31, 2018, and content thereof is incorporated herein by reference.

BACKGROUND ART

At present, as a wireless access method and a wireless network technology oriented to a fifth-generation cellular system, in the Third Generation Partnership Project (3GPP), technical research and standard formulation have been conducted for the Long Term Evolution (LTE)-Advanced Pro (an extension standard of LTE, i.e., LTE-A Pro) and the New Radio technology (NR technology) (Non-Patent Document 1).

In the fifth-generation cellular system, the following three scenarios are requested as assumptive scenarios of services: enhanced Mobile BroadBand (eMBB) for implementing high-speed/large-capacity transmission, Ultra-Reliable and Low Latency Communication (URLLC) for implementing low-latency/high-reliability communication, and massive Machine Type Communication (mMTC), such as the Internet of Things (IoT), in which a large number of machine type devices are connected.

CITATION LIST

Non Patent Literature

Non-Patent Document 1: RP-161214, NTT DOCOMO, "Revision of SI: Study on New Radio Access Technology", June, 2016

SUMMARY OF INVENTION

Problem to be Solved by the Invention

An objective of a solution of the present invention is to provide a terminal apparatus, a base station apparatus, a communication method, and an integrated circuit that can efficiently perform communication in a wireless communication system as described above.

Technical Solutions (1) In order to achieve the above objective, the solutions of the present invention adopt the following solution. That is, a terminal apparatus according to a solution of the present invention comprises: a receiving portion configured to receive setting of an initial Downlink (DL) Bandwidth Part (BWP) by using a Radio Resource Control (RRC) message, and receive a Downlink Control Information (DCI) format that schedules a Physical Downlink Shared Channel (PDSCH) in an active DL BWP; and a control portion configured to identify, based on a field in the DCI format, a resource block set to which the PDSCH is allocated and which is indicated by a start resource block and the number of consecutively allocated resource blocks. The setting of the initial DL BWP comprises setting a first parameter and a second parameter of a Control Resource SET (CORESET) #0, a value of an identifier of the CORESET #0 is 0, the first parameter represents the size of the CORESET #0, and the second parameter represents the size of the initial DL BWP. A serving cell is set with the initial DL BWP and an additional DL BWP, one of the initial DL BWP and the additional DL BWP is activated as the active DL BWP, and a value of the field in the DCI format is determined based on the size of the DL BWP, the start resource block, and the number of the consecutively allocated resource blocks. The size of the DCI format in a User Equipment (UE)-specific Search Space (USS) is determined based on the size of the CORESET #0, and when the field in the DCI format is applied to the active DL BWP, the size of the DL BWP is the size of the CORESET #0.

(2) In addition, a base station apparatus according to a solution of the present invention comprises: a transmitting portion configured to transmit setting of an initial downlink (DL) bandwidth part (BWP) by using a radio resource control (RRC) message, and transmit a downlink control information (DCI) format that schedules a physical downlink shared channel (PDSCH) in an active DL BWP; and a control portion configured to set, in a field in the DCI format, a value corresponding to a resource block set to which the PDSCH is allocated and which is indicated by a start resource block and the number of consecutively allocated resource blocks. The setting of the initial DL BWP comprises setting a first parameter and a second parameter of a control resource set (CORESET) #0, a value of an identifier of the CORESET #0 is 0, the first parameter represents the size of the CORESET #0, and the second parameter represents the size of the initial DL BWP. A serving cell is set with the initial DL BWP and an additional DL BWP, one of the initial DL BWP and the additional DL BWP is activated as the active DL BWP, and a value of the field in the DCI format is determined based on the size of the DL BWP, the start resource block, and the number of the consecutively allocated resource blocks. The size of the DCI format in a UE-specific search space (USS) is determined based on the size of the CORESET #0, and when the field in the DCI format is applied to the active DL BWP, the size of the DL BWP is the size of the CORESET #0.

(3) In addition, a communication method for a terminal apparatus according to a solution of the present invention has the following steps: receiving setting of an initial downlink (DL) bandwidth part (BWP) by using a radio resource control (RRC) message; receiving a downlink control information (DCI) format that schedules a physical downlink shared channel (PDSCH) in an active DL BWP; and identifying, based on a field in the DCI format, a resource block set to which the PDSCH is allocated and which is indicated by a start resource block and the number of consecutively allocated resource blocks. The setting of the initial DL BWP comprises setting a first parameter and a second parameter of a control resource set (CORESET) #0, a value of an identifier of the CORESET #0 is 0, the first parameter represents the size of the CORESET #0, and the second parameter represents the size of the initial DL BWP. A serving cell is set with the initial DL BWP and an additional DL BWP, one of the initial DL BWP and the additional DL BWP is activated as the active DL BWP, and a value of the field in the DCI format is determined based on the size of the DL BWP, the start resource block, and the number of the consecutively allocated resource blocks. The size of the DCI format in a UE-specific search space (USS) is determined based on the size of the CORESET #0, and when the field in the DCI format is applied to the active DL BWP, the size of the DL BWP is the size of the CORESET #0.

(4) In addition, a communication method for a base station apparatus according to a solution of the present invention has the following steps: transmitting setting of an initial downlink (DL) bandwidth part (BWP) by using a radio resource control (RRC) message; transmitting a downlink control information (DCI) format that schedules a physical downlink shared channel (PDSCH) in an active DL BWP; and setting, in a field in the DCI format, a value corresponding to a resource block set to which the PDSCH is allocated and which is indicated by a start resource block and the number of consecutively allocated resource blocks. The setting of the initial DL BWP comprises setting a first parameter and a second parameter of a control resource set (CORESET) #0, a value of an identifier of the CORESET #0 is 0, the first parameter represents the size of the CORESET #0, and the second parameter represents the size of the initial DL BWP. A serving cell is set with the initial DL BWP and an additional DL BWP, one of the initial DL BWP and the additional DL BWP is activated as the active DL BWP, and a value of the field in the DCI format is determined based on the size of the DL BWP, the start resource block, and the number of the consecutively allocated resource blocks. The size of the DCI format in a UE-specific search space (USS) is determined based on the size of the CORESET #0, and when the field in the DCI format is applied to the active DL BWP, the size of the DL BWP is the size of the CORESET #0.

Beneficial Effect

According to a solution of the present invention, a base station apparatus and a terminal apparatus can perform communication efficiently.

BRIEF DESCRIPTION OF DRAWINGS

FIG. 1 is a diagram showing the concept of a wireless communication system according to an implementation manner of the present invention.

FIG. 9 is a diagram showing an example of calculating an RIV according to an implementation manner of the present invention.

DETAILED DESCRIPTION

Figure 2:
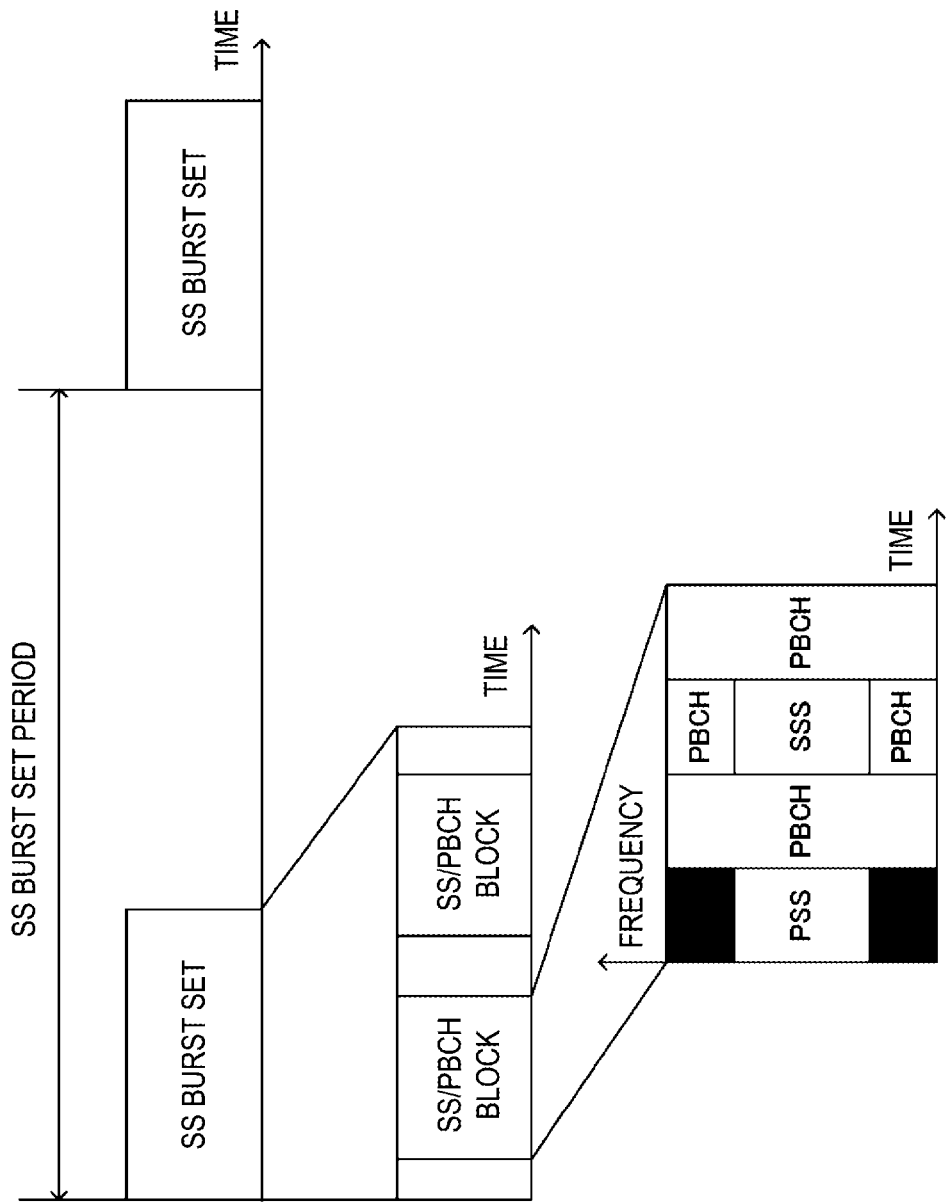
FIG. 2 is a diagram showing an example of an SS/PBCH block and an SS burst set according to an implementation manner of the present invention.

Implementation manners of the present invention will be described below.

FIG. 1 is a conceptual diagram of a wireless communication system according to the present implementation manner. In FIG. 1, the wireless communication system is provided with a terminal apparatus 1A, a terminal apparatus 1B, and a base station apparatus 3. The terminal apparatus 1A and the terminal apparatus 1B are also referred to as the terminal apparatus 1 below.

The terminal apparatus 1 may also be referred to as a user terminal, a mobile station apparatus, a communication terminal, a mobile device, a terminal, a User Equipment (UE), and a Mobile Station (MS). The base station apparatus 3 may also be referred to as a wireless base station apparatus, a base station, a wireless base station, a fixed station, an NB (NodeB), an evolved NodeB (eNB), a Base Transceiver Station (BTS), a BS (Base Station), an NR NB (NR Node B), an NNB, a Transmission and Reception Point (TRP), and a Gnb. The base station apparatus 3 may include a core network apparatus. In addition, the base station apparatus 3 may also be provided with one or a plurality of transmission reception points 4. At least a part of functions/processing of the base station apparatus 3 described below may be functions/processing of each transmission and reception point 4 included in the base station apparatus 3. The base station apparatus 3 may serve the terminal apparatus 1 by regarding a communicable range (communication area) controlled by the base station apparatus 3 as one or a plurality of cells. In addition, the base station apparatus 3 may also serve the terminal apparatus 1 by regarding a communicable range (communication area) controlled by one or a plurality of transmission and reception points 4 as one or a plurality of cells. In addition, one cell may be divided into a plurality of local areas (Beamed areas), and the terminal apparatus 1 is served in each local area. Here, the local area may be identified based on an index of the beam used in beamforming or a precoded index.

A wireless communication link from the base station apparatus 3 to the terminal apparatus 1 is referred to as a downlink. A wireless communication link from the terminal apparatus 1 to the base station apparatus 3 is referred to as an uplink.

In FIG. 1, in the wireless communication between the terminal apparatus 1 and the base station apparatus 3, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), and Multi-Carrier Code Division Multiplexing (MC-CDM) may be used.

In addition, in FIG. 1, in the wireless communication between the terminal apparatus 1 and the base station apparatus 3, Universal-Filtered Multi-Carrier (UFMC), Filtered OFDM (F-OFDM), Windowed OFDM, and Filter-Bank Multi-Carrier (FBMC) may also be used.

It should be noted that in the present implementation manner, the OFDM is used as a transport method, and OFDM symbols are used for illustration, but the present invention also includes the case that the above other transport methods are used.

In addition, in FIG. 1, in the wireless communication between the terminal apparatus 1 and the base station apparatus 3, the CP may not be used, or the above transport method with zero padding may be used to replace the CP. In addition, CP and zero padding may be added to both the front and the rear.

A solution of the present implementation manner may be operated in carrier aggregation or dual connection of a Radio Access Technology (RAT) referred to as LTE and LTE-A/LTE-A Pro. At this time, it may be used for part or all cells or cell groups, carriers or carrier groups (such as a Primary Cell (Pcell), a Secondary Cell (Scell), a Primary Secondary Cell (PSCell), a Master Cell Group (MCG), and a Secondary Cell Group (SCG)). In addition, it may also be used for standalone deployment of a separate operation. In a dual connection operation, a Special Cell (SpCell) is respectively referred to as a Pcell of an MCG or a PSCell of an SCG according to whether a Medium Access Control (MAC) entity is associated with the MCG or the SCG. If it is not a dual connection operation, the special cell (SpCell) is referred to as a Pcell. The SpCell supports PUCCH transmission and contention based random access.

In the present implementation manner, one or a plurality of serving cells may be set for the terminal apparatus 1. The set plurality of serving cells may include one primary cell and one or a plurality of secondary cells. The primary cell may be a serving cell that has performed an initial connection establishment procedure, a serving cell that has started a connection re-establishment procedure, or a cell that is indicated as a primary cell during a switching procedure. One or a plurality of secondary cells may be set at or after a time point when a radio resource control (RRC) connection is established. However, the plurality of set serving cells may include one primary secondary cell. The primary secondary cell may be a secondary cell capable of transmitting control information on the uplink among one or a plurality of secondary cells in which the terminal apparatus 1 is set. In addition, the terminal apparatus 1 may also be set with a subset of two types of serving cells, i.e., a master cell group and a secondary cell group. The master cell group may be composed of one primary cell and zero or more secondary cells. The secondary cell group may be composed of one primary secondary cell and zero or more secondary cells.

The wireless communication system of the present implementation manner may apply Time Division Duplex (TDD) and/or Frequency Division Duplex (FDD). The TDD manner or FDD manner can be applied to all of the plurality of cells. In addition, a cell to which the TDD manner is applied and a cell to which the FDD manner is applied may also be aggregated. The TDD manner may also be referred to as an Unpaired spectrum operation. The FDD manner may also be referred to as a Paired spectrum operation.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in a sidelink is referred to as a sidelink component carrier (or a sidelink carrier). The downlink component carrier, the uplink component carrier, and/or the sidelink component carrier are collectively referred to as component carriers (or carriers).

The physical channels and physical signals of the present implementation manner will be described.

In FIG. 1, in wireless communication between the terminal apparatus 1 and the base station apparatus 3, the following physical channels are used.

Physical Broadcast Channel (PBCH)
Physical Downlink Control Channel (PDCCH)
Physical Downlink Shared Channel (PDSCH)
Physical Uplink Control Channel (PUCCH)
Physical Uplink Shared Channel (PUSCH)
Physical Random Access Channel (PRACH)

The PBCH is used to broadcast an essential information block (Master Information Block (MIB), Essential Information Block (EIB), and Broadcast Channel (BCH)) that includes important system information required by the terminal apparatus 1.

In addition, the PBCH may be used to broadcast a time index within a period of a block of a Synchronization Signal (SS) (also referred to as an SS/PBCH block). Here, the time index is information indicating indexes of the synchronization signal and the PBCH in the cell. For example, in the case of transmitting the SS/PBCH block under the assumption of using three transmission beams (transmitting filtering setting and a Quasi Co-Location (QCL) related to receiving spatial parameters), it can represent a time sequence within a preset period or a set period. In addition, the terminal apparatus may identify a difference in the time indexes as a difference in the transmission beams.

The PDCCH is used to transmit (or transfer) Downlink Control Information (DCI) in downlink wireless communication (wireless communication from the base station apparatus 3 to the terminal apparatus 1). Here, one or a plurality of DCIs (also referred to as DCI formats) are defined for the transmission of the downlink control information. That is, a field for the downlink control information is defined as the DCI, and is mapped to information bits. The PDCCH is transmitted among PDCCH candidates. The terminal apparatus 1 monitors a collection of PDCCH candidates in the serving cell. The monitoring means trying to decode the PDCCH according to a certain DCI format.

For example, the following DCI format may be defined.
DCI format 0_0
DCI format 0_1
DCI format 1_0
DCI format 1_1
DCI format 2_0
DCI format 2_1
DCI format 2_2
DCI format 2_3

The DCI format 0_0 may include information representing scheduling information (frequency domain resource allocation and time domain resource allocation) of the PUSCH.

The DCI format 0_1 may include: information representing scheduling information (frequency domain resource allocation and time domain resource allocation) of the PUSCH, information representing the bandwidth part (BWP), a Channel State Information (CSI) request, a Sounding Reference Signal (SRS) request, and information related to an antenna port.

The DCI format 1_0 may include information representing scheduling information (frequency domain resource allocation and time domain resource allocation) of the PDSCH.

The DCI format 1_1 may include: information representing scheduling information (frequency domain resource allocation and time domain resource allocation) of the PDSCH, information representing the bandwidth part (BWP), a Transmission Configuration Indication (TCI), and information related to the antenna port.

DCI format 2_0 is used to notify a slot format of one or a plurality of slots. The slot format is defined as that each OFDM symbol in the slot is classified into any one of downlink, variable, and uplink. For example, in the case that the slot format is 28, DDDDDDDDDDDDFU is applied to OFDM symbols of 14 symbols in the slot indicating the slot format 28. Here, D is a downlink symbol, F is a variable symbol, and U is an uplink symbol. It should be noted that the slot will be described later.

The DCI format 2_1 is used to notify the terminal apparatus 1 of a physical resource block and an OFDM symbol that may be assumed to be not transmitted. It should be noted that this information may also be referred to as a preemption indication (an intermittent transmission indication).

The DCI format 2_2 is used to transmit the PUSCH and a Transmit Power Control (TPC) command for the PUSCH.

The DCI format 2_3 is used to transmit a group of TPC commands for sounding reference signal (SRS) transmission implemented by one or a plurality of terminal apparatuses 1. In addition, the SRS request may be transmitted together with the TPC commands. In addition, in the DCI format 2_3, it is possible to define SRS requests and TPC commands for uplinks where the PUSCH and the PUCCH do not exist or uplinks where transmit power control of the SRS does not establish an association with transmit power control of the PUSCH.

The DCI for the downlink is also referred to as a downlink grant or a downlink assignment. Here, the DCI for the uplink is also referred to as an uplink grant or an uplink assignment.

A Cyclic Redundancy Check (CRC) parity bit attached to the DCI format transmitted through a PDCCH may be scrambled by a Cell-Radio Network Temporary Identifier (C-RNTI), a Configured Scheduling-Radio Network Temporary Identifier (CS-RNTI), a Random Access-Radio Network Temporary Identity (RA-RNTI), or a Temporary C-RNTI. The C-RNTI and the CS-RNTI are identifiers used to identify a terminal apparatus in a cell. The temporary C-RNTI is an identifier used to identify a terminal apparatus that has transmitted a random access preamble in a contention based random access procedure.

The C-RNTI (the identifier (identification information) of the terminal apparatus) is used to control the PDSCH or PUSCH in one or a plurality of slots. The CS-RNTI is used to periodically allocate resources of the PDSCH or PUSCH. The temporary C-RNTI is used to control PDSCH transmission or PUSCH transmission in one or a plurality of slots. The temporary C-RNTI is used to schedule retransmission of a random access message 3 and transmission of a random access message 4. The RA-RNTI (random access response identification information) is determined according to the frequency and time location information of the physical random access channel that has transmitted the random access preamble.

The PUCCH is used to transmit Uplink Control Information (UCI) in uplink wireless communication (wireless communication from the terminal apparatus 1 to the base station apparatus 3). Here, the uplink control information may include channel state information (CSI) for indicating a state of the downlink channel. In addition, the uplink control information may include a Scheduling Request (SR) for requesting UL-SCH resources. In addition, the uplink control information may include a Hybrid Automatic Repeat request ACKnowledgement (HARQ-ACK). The HARQ-ACK may represent an HARQ-ACK for downlink data (a Transport block (TB), a Medium Access Control Protocol Data Unit (MAC PDU), and a Downlink-Shared Channel (DL-SCH)).

The PDSCH is used to transmit downlink data (DL-SCH) from the medium access (MAC) layer. In addition, in the case of the downlink, it is also used to transmit System Information (SI), a Random Access Response (RAR), and the like.

The PUSCH may be used to transmit the HARQ-ACK and/or CSI together with uplink data (Uplink Shared Channel, UL-SCH) from the MAC layer or together with the uplink data. In addition, it may also be used to transmit only the CSI or transmit only the HARQ-ACK and CSI. That is, it may also be used to transmit only the UCI.

Here, the base station apparatus 3 and the terminal apparatus 1 exchange (receive and transmit) signals at a higher layer. For example, the base station apparatus 3 and the terminal apparatus 1 may receive and transmit RRC signaling (also referred to as a Radio Resource Control message (RRC message), or radio resource control information (RRC information)) at a radio resource control (RRC) layer. In addition, the base station apparatus 3 and the terminal apparatus 1 may also receive and transmit a MAC control element at the medium access control (MAC) layer. Here, the RRC signaling and/or MAC control element is also referred to as higher layer signaling. The higher layer here means a higher layer observed from the physical layer. Therefore, it may include one or a plurality of a MAC layer, an RRC layer, an RLC layer, a PDCP layer, a Non Access Stratum (NAS), and so on. For example, in the processing of the MAC layer, the higher layer may include one or a plurality of the RRC layer, the RLC layer, the PDCP layer, and the NAS layer.

The PDSCH or PUSCH may be used to transmit the RRC signaling and the MAC control element. Here, in the PDSCH, the RRC signaling transmitted from the base station apparatus 3 may be signaling common to a plurality of terminal apparatuses 1 in the cell. In addition, the RRC signaling transmitted from the base station apparatus 3 may also be signaling dedicated to a certain terminal apparatus 1 (also referred to as dedicated signaling). That is, the dedicated signaling may be used to transmit terminal apparatus-specific (UE-specific) information to the certain terminal apparatus 1. In addition, the PUSCH may be used to transmit UE Capability on the uplink.

In FIG. 1, the following downlink physical signals are used in downlink wireless communication. Here, the downlink physical signal is not used to transmit information output from the higher layer, but is used by the physical layer.

Synchronization signal (SS)

Reference Signal (RS)

The synchronization signal may include a Primary Synchronization Signal (PSS) and a Secondary Synchronization Signal (SSS). The PSS and the SSS may be used to detect a cell ID.

The synchronization signal is used for the terminal apparatus 1 to acquire synchronization of the frequency domain and the time domain of the downlink. Here, the synchronization signal may be used for the terminal apparatus 1 to select precoding performed by the base station apparatus 3, or precoding or a beam in beamforming. It should be noted that the beam may also be referred to as transmission or reception filtering setting, or spatial domain transmission filtering, or spatial domain reception filtering.

The reference signal is used for the terminal apparatus 1 to perform transport path compensation of the physical channel. Here, the reference signal may also be used for the terminal apparatus 1 to calculate a CSI of the downlink. In addition, the reference signal may be used for Fine synchronization, and the fine synchronization can realize fine synchronization to the extent of synchronization of wireless parameters, parameter sets such as subcarrier intervals, and FFT windows.

In the present implementation manner, any one or a plurality of the following downlink reference signals are used.

Demodulation Reference Signal (DMRS)
Channel State Information Reference Signal (CSI-RS)
Phase Tracking Reference Signal (PTRS)
Tracking Reference Signal (TRS)

The DMRS is used to demodulate a modulated signal. It should be noted that a reference signal used to demodulate the PBCH and a reference signal used to demodulate the PDSCH may be defined in the DMRS, and the two may be referred to as the DMRS. The CSI-RS is used for channel state information (CSI) measurement and beam management, applying a periodic or semi-static or aperiodic CSI reference signal transmission method. In the CSI-RS, a Non-Zero Power (NZP) CSI-RS and a zero transmission power (or reception power) (Zero Power (ZP)) CSI-RS may be defined. Here, the ZP CSI-RS may be defined as a CSI-RS resource that has a zero transmission power or does not perform transmission. The PTRS is used to track the phase on a time axis to ensure frequency offset caused by phase noise. The TRS is used to ensure Doppler shift during high-speed movement. It should be noted that the TRS may be used as a setting of the CSI-RS. For example, the CSI-RS of one port may also be used as the TRS to set radio resources.

In the present implementation manner, any one or a plurality of the following uplink reference signals are used.

DMRS
PTRS
SRS

The DMRS is used to demodulate a modulated signal. It should be noted that two types of reference signals, i.e., a reference signal used to demodulate the PUCCH and a reference signal f used to demodulate the PUSCH may be defined in the DMRS, and the two may be referred to as the DMRS. The SRS is used for uplink channel state information (CSI) measurement, channel sounding, and beam management. The PTRS is used to track the phase on the time axis to ensure the frequency offset caused by phase noise.

The downlink physical channels and/or downlink physical signals are collectively referred to as downlink signals. The uplink physical channels and/or uplink physical signals are collectively referred to as uplink signals. The downlink physical channels and/or the uplink physical channels are collectively referred to as physical channels. The downlink physical signals and/or the uplink physical signals are collectively referred to as physical signals.

The BCH, the UL-SCH, and the DL-SCH are transport channels. A channel used at the medium access control (MAC) layer is referred to as a transport channel. A unit of the transport channel used at the MAC layer is also referred to as a transport block (TB) and/or a MAC protocol data unit (MAC PDU). At the MAC layer, hybrid automatic repeat request (HARQ) control is performed for each transport block. The transport block is a unit of data delivered from the MAC layer to the physical layer. At the physical layer, transport blocks are mapped to codewords, and encoding is performed for each codeword.

FIG. 2 is a diagram showing an example of an SS/PBCH block (also referred to as a synchronization signal block, an SS block, and an SSB) and an SS burst set (also referred to as a synchronization signal burst set) in the present implementation manner. FIG. 2 shows an example in which 2 SS/PBCH blocks are included in a periodically transmitted SS burst set, and the SS/PBCH block is composed of 4 consecutive OFDM symbols.

The SS/PBCH block is a unit block including at least the synchronization signal (PSS, SSS) and/or the PBCH. Transmission of the signal/channel included in the SS/PBCH block is expressed as transmission of the SS/PBCH block. In the case of transmitting the synchronization signal and/or PBCH by using one or a plurality of SS/PBCH blocks in the SS burst set, the base station apparatus 3 may transmit the beam by using an independent downlink for each SS/PBCH block.

In FIG. 2, time division multiplexing/frequency division multiplexing is performed on the PSS, the SSS, and the PBCH in one SS/PBCH block. Wherein, the sequence of performing multiplexing on the PSS, the SSS and/or the PBCH in the time domain may be different from that in the example shown in FIG. 2.

The SS burst set may be transmitted periodically. For example, a period for initial access and a period set for a connected (Connected or RRC_Connected) terminal apparatus may be defined. In addition, the period set for the connected (Connected or RRC_Connected) terminal apparatus may be set at the RRC layer. In addition, the period set for the connected (Connected or RRC_Connected) terminal is a period of time-domain radio resources that may potentially be transmitted, and may actually be determined whether to be transmitted by the base station apparatus 3. In addition, the period for initial access may be pre-defined in a specification and the like.

The SS burst set may be determined based on a System Frame Number (SFN). In addition, a start location (a boundary) of the SS burst set may be determined based on the SFN and the period.

For the SS/PBCH block, an SSB index (also referred to as an SSB/PBCH block index) is allocated according to a temporal location in the SS burst set. The terminal apparatus 1 calculates the SSB index based on information of the PBCH and/or information of the reference signal included in the detected SS/PBCH block.

The same SSB index is allocated to SS/PBCH blocks with the same relative time in each SS burst set in a plurality of SS burst sets. It may be assumed that the SS/PBCH blocks with the same relative time in each SS burst set in the plurality of SS burst sets are QCLs (or apply the same downlink transmission beam). In addition, it may also be assumed that antenna ports of the SS/PBCH blocks with the same relative time in each SS burst set in the plurality of SS burst sets are QCLs related to average delay, Doppler shift, and spatial correlation.

It may also be assumed that within the period of a certain SS burst set, the SS/PBCH blocks allocated with the same SSB index are QCLs related to average delay, average gain, Doppler spread, Doppler shift, and spatial correlation. The setting corresponding to one or a plurality of SS/PBCH blocks (or reference signals) serving as the QCLs may be referred to as QCL setting.

The number of SS/PBCH blocks (which may be referred to as the number of SS blocks or the number of SSBs) may be defined as, for example, the number (quantity) of SS/PBCH blocks in the SS burst or SS burst set or in the period of the SS/PBCH block. In addition, the number of SS/PBCH blocks may represent the quantity of beam groups used for cell selection in the SS burst or in the SS burst set or in the periodicity of the SS/PBCH block. Here, the beam group may be defined as: the quantity of different SS/PBCH blocks or the quantity of different beams included in the SS burst or in the SS burst set or in the periodicity of the SS/PBCH block.

The reference signals illustrated in the present implementation manner below include a downlink reference signal, a synchronization signal, an SS/PBCH block, a downlink DM-RS, a CSI-RS, an uplink reference signal, an SRS and/or an uplink DM-RS. For example, the downlink reference signal, the synchronization signal, and/or the SS/PBCH block may be referred to as reference signals. Reference signals used in the downlink include the downlink reference signal, the synchronization signal, the SS/PBCH block, the downlink DM-RS, the CSI-RS, and the like. Reference signals used in the uplink include the uplink reference signal, the SRS, and/or the uplink DM-RS, and the like.

In addition, the reference signal may be used for Radio Resource Measurement (RRM). In addition, the reference signal may be used for beam management.

The beam management may be a procedure of performing directivity matching on analog and/or digital beams in the transmission apparatus (the base station apparatus 3 in the case of downlink, and the terminal apparatus 1 in the case of uplink) with analog and/or digital beams in the reception apparatus (the terminal apparatus 1 in the case of downlink, and the base station apparatus 3 in the case of uplink) to obtain the base station apparatus 3 and/or terminal apparatus 1 having a beam gain.

It should be noted that, as a procedure of configuring, setting, or establishing beam pairing, the following procedures may be included.

Beam selection
Beam refinement
Beam recovery

For example, the beam selection may be a procedure of selecting a beam in the communication between the base station apparatus 3 and the terminal apparatus 1. In addition, the beam refinement may be a procedure of further selecting a beam with a high gain or changing the optimal beam between the base station apparatus 3 and the terminal apparatus 1 through the movement of the terminal apparatus 1. The beam recovery may be a procedure of reselecting a beam when the quality of the communication link is degraded due to congestion caused by obstructions, the passage of people, and the like in the communication between the base station apparatus 3 and the terminal apparatus 1.

The beam management may include the beam selection and the beam refinement. The beam recovery may include the following procedures.

Detect beam failure
Discover a new beam
Transmit a beam recovery request
Monitor a response to the beam recovery request For example, when the transmission beam from the base station apparatus 3 to the terminal apparatus 1 is selected, a Reference Signal Received Power (RSRP) of the CSI-RS or the SSS included in the SS/PBCH block may be used, or the CSI may be used. In addition, as a report to the base station apparatus 3, a CSI-RS Resource Index (CRI) may be used, or an index that is included in the SS/PBCH and indicated by the PBCH and/or a sequence of the demodulation reference signal (DMRS) used for PBCH demodulation may also be used.

In addition, the base station apparatus 3 indicates a time index of the CRI or SS/PBCH when indicating the beam to the terminal apparatus 1, and the terminal apparatus 1 performs reception based on the indicated time index of the CRI or SS/PBCH. At this time, the terminal apparatus 1 may set and receive spatial filtering based on the indicated time index of the CRI or SS/PBCH. In addition, the terminal apparatus 1 may use the assumption of the Quasi Co-Location (QCL) to perform reception. A certain signal (such as an antenna port, a synchronization signal, and a reference signal) and other signals (such as antenna ports, synchronization signals, and reference signals) being "the QCLs" or "using the assumption of the QCLs" may be interpreted as that a certain signal establishes an association with other signals.

If a Long Term Property of a channel that transmits a certain symbol in a certain antenna port can be estimated from a channel that transmits a certain symbol in an antenna port of the other party, the two antenna ports are considered as QCLs. The long term property of the channel includes one or a plurality of delay spread, Doppler spread, Doppler shift, average gain, and average delay. For example, when an antenna port 1 and an antenna port 2 are QCLs related to the average delay, it means that reception timing of the antenna port 2 can be estimated according to reception timing of the antenna port 1.

The QCL may also be extended to beam management. Therefore, the QCL extended to the space may also be redefined. For example, the Long term property of the channel in the assumption regarded as the QCL in the spatial domain may be an angle of arrival (Angle of Arrival (AoA), Zenith angle of Arrival (ZoA), etc.) and/or Angle Spread (for example, Angle Spread of Arrival (ASA) and Zenith angle Spread of Arrival (ZSA)), an angle of departure (AoD (angle of departure), ZoD, etc.) or its Angle Spread (for example, Angle Spread of Departure (ASD), Zenith angle Spread of Departure (ZSD)), Spatial Correlation, and a reception spatial parameter in the radio link or the channel.

For example, when it is considered that the reception space parameter between the antenna port 1 and the antenna port 2 is the QCL, it means that a reception beam that receives a signal from the antenna port 2 can be estimated according to a reception beam (reception space filtering) that receives a signal from the antenna port 1.

As a QCL type, it is possible to define a combination of long term properties that may be regarded as QCLs. For example, the following types may be defined.

Type A: Doppler shift, Doppler spread, average delay, delay spread
Type B: Doppler shift, Doppler spread
Type C: Average delay, Doppler shift
Type D: Reception spatial parameter The above QCL type may set and/or indicate one or two reference signals and the assumption of the QCL of the PDCCH or PDSCH DMRS as a Transmission Configuration Indication (TCI) by using the RRC and/or MAC layer and/or DCI. For example, in the case that an index #2 of the SS/PBCH block and the QCL type A+QCL type B are set and/or indicated as a state of the TCI when the terminal apparatus 1 receives the PDCCH, when receiving the PDCCH DMRS, the terminal apparatus 1 may receive the DMRS of the PDCCH while regarding it as Doppler shift, Doppler spread, average delay, delay spread, reception space parameter, and long term property of the channel during reception of the SS/PBCH block index #2, and perform synchronization and transmission path estimation. At this time, a reference signal indicated by the TCI (the SS/PBCH block in the above example) may be referred to as a source reference signal, and a reference signal (the PDCCH DMRS in the above example) that is influenced by the long term property and estimated from the long term property of the channel when the source reference signal is received may be referred to as a target reference signal. In addition, the TCI may set, through the RRC, a combination of a source reference signal and a QCL type for one or a plurality of TCI states and various states, and perform indication on the terminal apparatus 1 through the MAC layer or DCI.

According to the method, as beam management and beam indication/reporting, actions of the base station apparatus 3 and the terminal apparatus 1 equivalent to the beam management may be defined according to the assumption of the QCL in the spatial domain and radio resources (time and/or frequency).

A subframe will be described below. In the present implementation manner, it is referred to as a subframe, but it may also be referred to as a resource unit, a radio frame, a temporal interval, a time interval, and so on.

Figure 3:
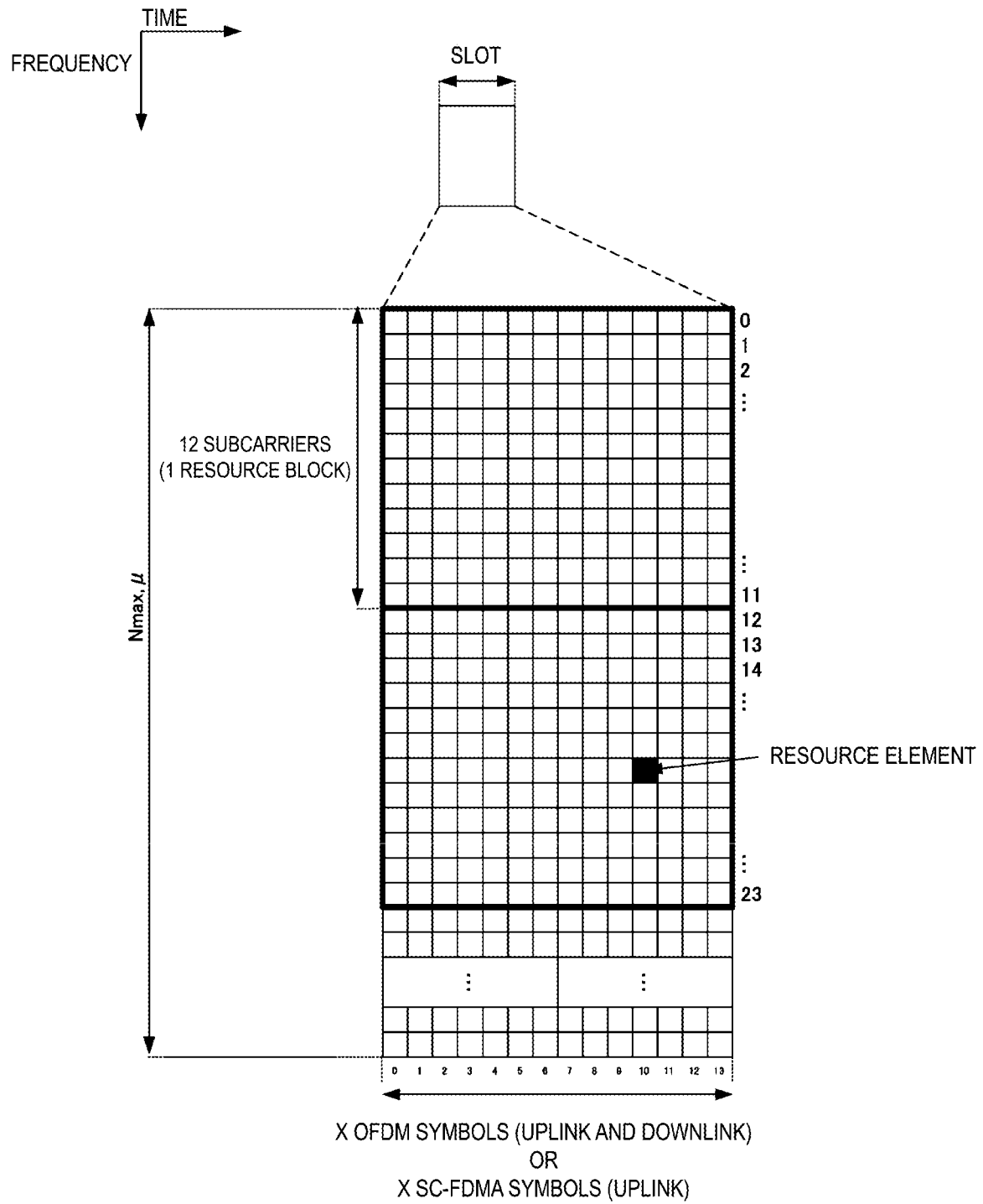
FIG. 3 is a diagram showing an example of a schematic configuration of uplink and downlink slots according to an implementation manner of the present invention.

FIG. 3 is a diagram showing an example of a schematic configuration of uplink and downlink slots according to a first implementation manner of the present invention. The length of each radio frame is 10 ms. In addition, each radio frame is composed of 10 subframes and W slots. In addition, one slot is composed of X OFDM symbols. In other words, the length of one subframe is 1 ms. The time length of each slot is defined by a subcarrier interval. For example, in the case that a subcarrier interval of the OFDM symbol is 15 kHz and is a Normal Cyclic Prefix (NCP), X=7 or X=14, which are 0.5 ms and 1 ms, respectively. In addition, in the case that the subcarrier interval is 60 kHz, X=7 or X=14, which are 0.125 ms and 0.25 ms, respectively. In addition, for example, in the case of X=14, when the subcarrier interval is 15 kHz, W=10, and when the subcarrier interval is 60 kHz, W=40. FIG. 3 shows the case of X=7 as an example. It should be noted that the extension can also be performed when X=14. In addition, the uplink slot may also be defined in the same manner, or the downlink slot and the uplink slot may be defined respectively. In addition, the bandwidth of a cell of FIG. 3 may be defined as a part of the frequency band (i.e., the BWP). In addition, the slot may be defined as a Transmission Time Interval (TTI). The slot may not be defined as a TTI. The TTI may be a transmission time period of a transport block.

Signals or physical channels transmitted in various slots may be expressed by a resource grid. The resource grid defines various parameter sets (subcarrier intervals and cyclic prefix lengths) and various carriers through a plurality of subcarriers and a plurality of OFDM symbols. The quantity of subcarriers configuring a slot depends on the downlink bandwidth and uplink bandwidth of the cell respectively. Various elements in the resource grid are referred to as resource elements. The resource elements may be identified by using numbers of the subcarriers and numbers of the OFDM symbols.

The resource grid is used to express mapping of resource elements of a certain physical downlink channel (such as the PDSCH) or uplink channel (such as the PUSCH). For example, in the case that the subcarrier interval is 15 kHz, and the number of OFDM symbols included in the subframe X=14 and it is NCP, one physical resource block is defined by 14 consecutive OFDM symbols in the time domain and 12*N max consecutive subcarriers in the frequency domain.

The N max is the maximum number of resource blocks determined by a subcarrier interval setting μ described later. In other words, the resource grid is composed of (14*12*N max, μ) resource elements. In the case of an Extended CP (ECP), only a subcarrier interval of 60 kHz is supported. Therefore, one physical resource block is defined by, for example, 12 (the number of OFDM symbols included in a slot)*4 (the number of slots included in a subframe)=48 consecutive OFDM symbols in the time domain and 12*N max, μ consecutive subcarriers in the frequency domain. In other words, the resource grid is composed of (48*12*N max, μ) resource elements.

As resource blocks, a reference resource block, a common resource block, a physical resource block, and a virtual resource block are defined. One resource block is defined as 12 consecutive subcarriers in the frequency domain. The reference resource blocks are common in all subcarriers. For example, the resource blocks may be configured at a subcarrier interval of 15 kHz, and labeled with numbers in ascending order. A subcarrier index 0 of a reference resource block index 0 may also be referred to as a reference point A (point A) (or only referred to as a "reference point"). The common resource blocks are resource blocks labeled with numbers in ascending order starting from 0 in various subcarrier interval setting μ starting from the reference point A. The above resource grid is defined by the common resource blocks. The physical resource blocks are resource blocks that are included in the bandwidth part (BWP) described later and labeled with numbers in ascending order starting from 0, and the physical resource blocks are resource blocks that are included in the bandwidth part (BWP) and marked with numbers in ascending order starting from 0. First, a certain physical uplink channel is mapped to a virtual resource block. After that, the virtual resource block is mapped to the physical resource block. In the following, a resource block may be a virtual resource block, a physical resource block, a common resource block, or a reference resource block.

Next, the subcarrier interval setting μ will be described. As described above, one or a plurality of OFDM parameter sets are supported in an NR. In a certain BWP, the subcarrier interval setting μ (μ=0, 1 . . . 5) and the cyclic prefix length are given by the higher layer (upper layer) for the downlink BWP, and given by the higher layer in the uplink BWP. Here, when μ is given, the subcarrier interval Δf is given by Δf=2^μ·15 (kHz).

In the subcarrier interval setting μ, the slots are counted from 0 to N^{subframe, μ}_{slot}−1 in ascending order within the subframe, and counted from 0 to N^{frame, μ}_{slot}−1 in ascending order within the frame. Based on the slot setting and the cyclic prefix, N^{slot}_{symb} consecutive OFDM symbols are located in the slot. The N^{slot}_{symb} is 14. A starting point of the slot n^{μ}_{s} in the subframe is aligned in time to a starting point of the n^{μ}_{s}N^{slot}_{symb}-th OFDM symbol in the same subframe.

Figure 4:
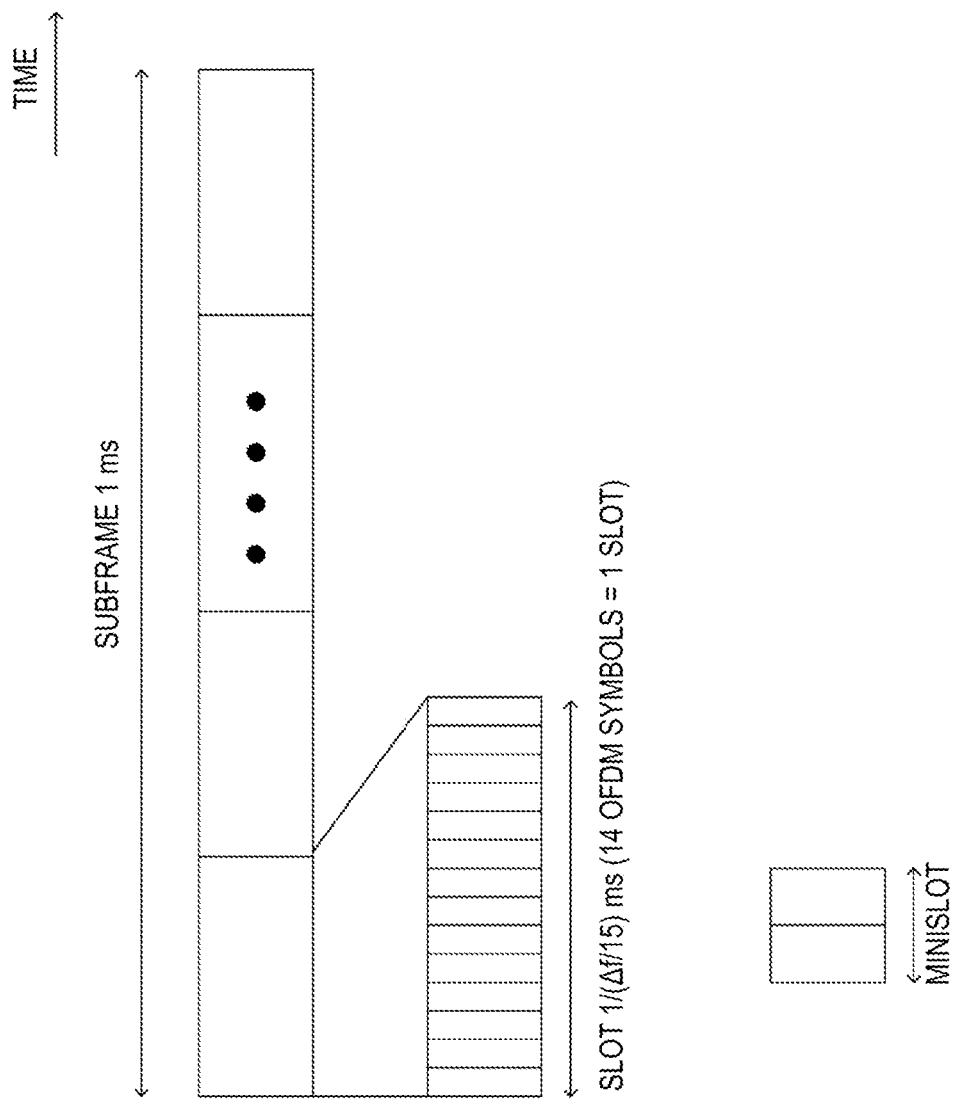
FIG. 4 is a diagram showing relationships among subframes, slots, and minislots in a time domain according to an implementation manner of the present invention.

Next, the subframes, the slots, and the minislot will be described. FIG. 4 is a diagram showing relationships among subframes, slots, and minislot in the time domain. As shown in FIG. 4, three time units are defined. Regardless of the subcarrier interval, the subframe is 1 ms, the number of OFDM symbols included in the slot is 7 or 14, and the slot length varies according to the subcarrier interval. Here, in the case that the subcarrier interval is 15 kHz, 14 OFDM symbols are included in one subframe. The downlink slot may also be referred to as a PDSCH mapping type A. The uplink slot may also be referred to as a PUSCH mapping type A.

A minislot (may also be referred to as a subslot) is a time unit composed of OFDM symbols less than the number of the OFDM symbols included in the slot. FIG. 4 shows a case of the minislot including two OFDM symbols as an example. The OFDM symbols in the minislot may also have the timing consistent with that of the OFDM symbols configuring the slot. It should be noted that the smallest unit of scheduling may be a slot or a minislot. In addition, the allocation of mini-slots may also be referred to as non-slot base scheduling. In addition, the scheduling the minislot may be expressed as scheduling the reference signal and a relative time location of a start location of the data as fixed resources. A downlink minislot may also be referred to as a PDSCH mapping type B. An uplink minislot may also be referred to as a PUSCH mapping type B.

Figure 5:
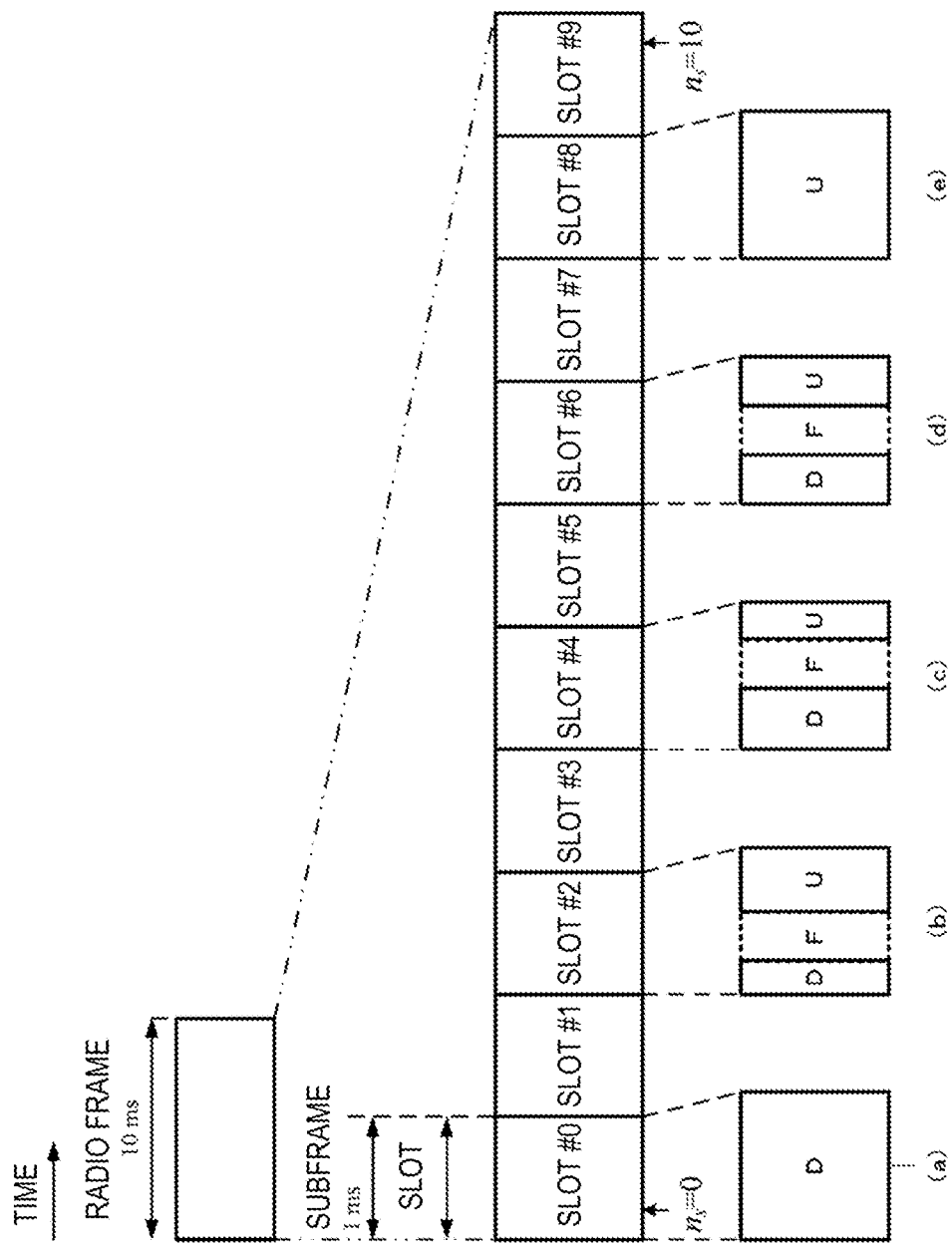
FIG. 5 is a diagram showing an example of a slot or subframe according to an implementation manner of the present invention.

FIG. 5 is a diagram showing an example of a slot format. Here, a case of the slot length being 1 ms in a subcarrier interval of 15 kHz is shown as an example. In FIG. 5, D represents the downlink, and U represents the uplink. As shown in FIG. 5, a certain temporal interval (for example, the smallest temporal interval that must be allocated to a UE in a system) may include one or a plurality of:

a downlink symbol
a variable symbol
an uplink symbol

It should be noted that a ratio thereof may be predefined as a slot format. In addition, it may also be defined by the number of downlink OFDM symbols included in the slot or by a start location and an end location in the slot. In addition, it may also be defined by the number of uplink OFDM symbols or DFT-S-OFDM symbols included in the slot or by the start location and the end location in the slot. It should be noted that the scheduling the slot may be expressed as scheduling the reference signal and a relative time location of a slot boundary as fixed resources.

The terminal apparatus 1 may receive a downlink signal or a downlink channel by using a downlink symbol or a variable symbol. The terminal apparatus 1 may also transmit an uplink signal or the downlink channel by using an uplink symbol or a variable symbol.

In (a) of FIG. 5, it is an example in which a certain temporal interval (for example, which may be referred to as the smallest unit, time unit, or the like of time resources that can be allocated to a UE. In addition, the smallest units of a plurality of time resources may also be jointly referred to as a time unit) is all used for downlink transmission. In (b) of FIG. 5, in the first time resource, for example, uplink scheduling is performed via the PDCCH, and an uplink signal is transmitted via a generated variable symbol that includes processing delay of the PDCCH, the switching time from downlink to uplink, and the transmission signal. In (c) of FIG. 5, the first time resource is used to transmit the PDCCH and/or the downlink PDSCH, and is used to transmit the PUSCH or PUCCH at a generated interval used for the processing delay, the switching time from downlink to uplink, and the transmission signal. Here, as an example, the uplink signal may be used to transmit the HARQ-ACK and/or CSI, that is, the UCI. In (d) of FIG. 5, the initial time resource is used to transmit the PDCCH and/or PDSCH, and is used to transmit the uplink PUSCH and/or PUCCH at a generated interval used for the processing delay, the switching time from downlink to uplink, and the transmission signal. Here, as an example, the uplink signal may be used to transmit uplink data, that is, the UL-SCH. In I of FIG. 5, it is an example where all are used for uplink transmission (PUSCH or PUCCH).

The above downlink part and uplink part may include a plurality of OFDM symbols as in the LTE.

Figure 6:
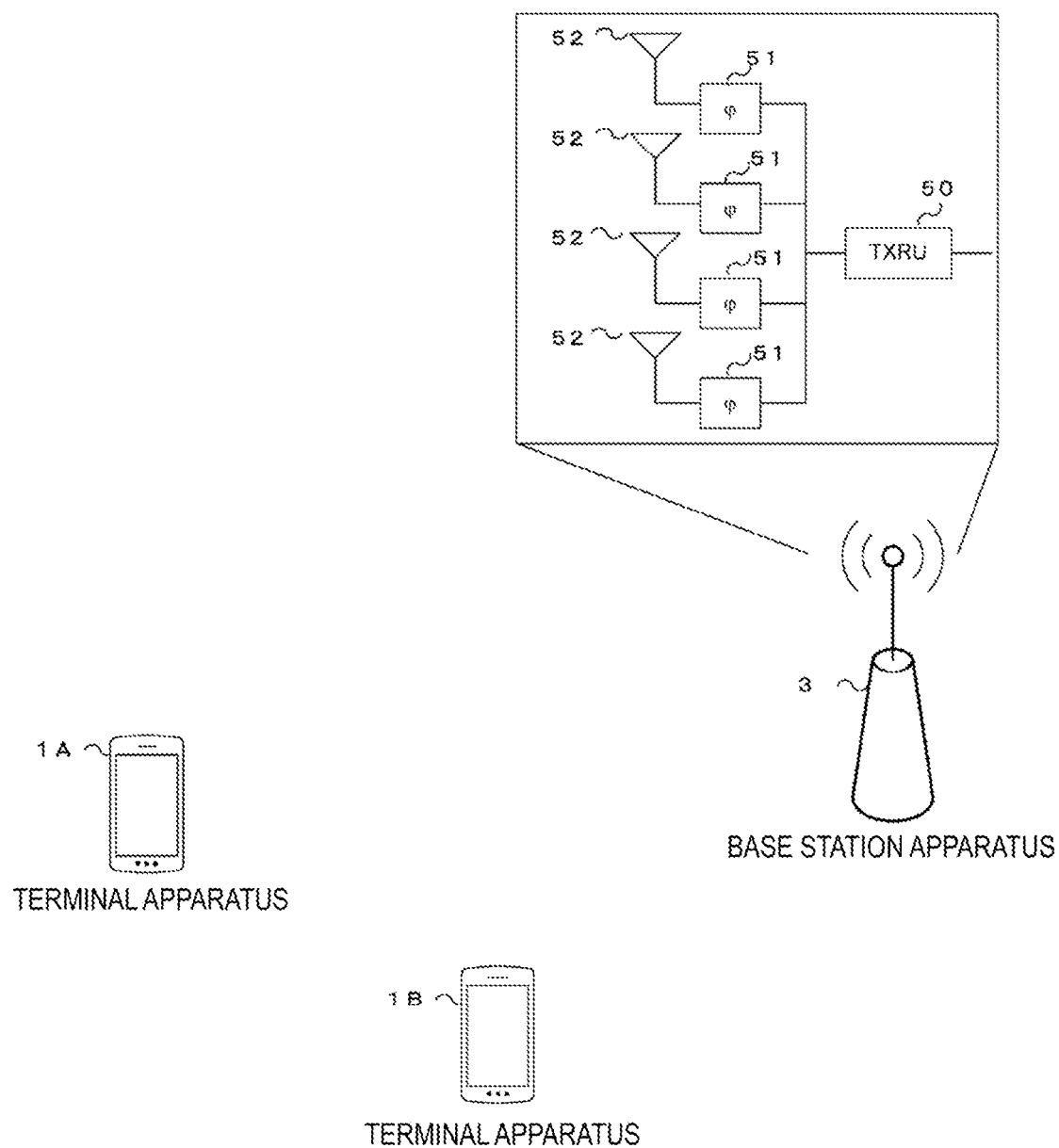
FIG. 6 is a diagram showing an example of beamforming according to an implementation manner of the present invention.

FIG. 6 is a diagram showing an example of beamforming. A plurality of antenna elements are connected to a Transceiver unit (TXRU) 50, and the phase is controlled by a phase shifter 51 of each antenna element. By transmitting from the antenna element 52, a beam can be directed in any direction with respect to a transmission signal. Typically, the TXRU may be defined as an antenna port, and it is possible to only define the antenna port in the terminal apparatus 1. By controlling the phase shifter 51, the directivity can be directed in any direction. Therefore, the base station apparatus 3 can perform communication with the terminal apparatus 1 by using a beam with a high gain.

The bandwidth part (BWP) will be described below. The BWP is also referred to as a carrier BWP. The BWP may be set respectively for the downlink and the uplink. The BWP is defined as a collection of consecutive physical resources selected from consecutive subsets of a common resource block. The terminal apparatus 1 may set up to four BWPs that activate one downlink carrier BWP (DL BWP) at a certain time. The terminal apparatus 1 may set up to four BWPs that activate one uplink carrier BWP (UL BWP) at a certain time. In the case of carrier aggregation, the BWPs may be set in various serving cells. At this time, a certain serving cell set with one BWP may be expressed as setting with no BWP. In addition, setting with two or more BWPs may be expressed as setting with a BWP.

<MAC Entity Action>

In an activated serving cell, an active (activated) BWP always exists. A BWP switching for a certain serving cell is used to activate an inactive (deactivated) BWP and deactivate an active (activated) BWP. The BWP switching for a certain serving cell is controlled by a PDCCH indicating downlink assignment or uplink grant. The BWP switching for a certain serving cell may be controlled by a BWP inactivity timer or RRC signaling, or by the MAC entity itself at the beginning of a random access procedure. In addition of the SpCell (Pcell or PSCell) or activation of the Scell, a BWP is activated first, and the PDCCH indicating the downlink assignment or uplink grant will not be received. The first activated DL BWP (first active DL BWP) and first activated UL BWP (first active UL BWP) may be specified by an RRC message transmitted from the base station apparatus 3 to the terminal apparatus 1. The activated BWP for a certain serving cell is specified by the RRC or PDCCH transmitted from the base station apparatus 3 to the terminal apparatus 1. In addition, the first activated DL BWP (first active DL BWP) and first activated UL BWP (first active UL BWP) may be included in a message 4. In an Unpaired spectrum (such as a TDD frequency band), the DL BWP and the UL BWP are paired, and the BWP switching is common for the UL and the DL. In the activated BWPs for various activated serving cells set with BWPs, the MAC entity of the terminal apparatus 1 applies normal processing. The normal processing includes transmitting the UL-SCH, transmitting the RACH, monitoring the PDCCH, transmitting the PUCCH, transmitting the SRS, and receiving the DL-SCH. In the deactivated BWPs for various activated serving cells set with BWPs, the MAC entity of the terminal apparatus 1 does not transmit the UL-SCH, does not transmit the RACH, does not monitor the PDCCH, does not transmit the PUCCH, does not transmit the SRS, and does not receive the DL-SCH. It may also be set that when a certain serving cell is deactivated, no active BWP exists (for example, the active BWP is deactivated).

<RRC Action>

The BWP Information Element (IE) included in the RRC message (broadcast system information, information transmitted through a dedicated RRC message) is used to set the BWP. The RRC message transmitted from the base station apparatus 3 is received by the terminal apparatus 1. For various serving cells, the network (base station apparatus 3, etc.) sets at least an initial BWP at least including a downlink BWP and one (in the case if the serving cell is set with an uplink, etc.) or two (in the case of using an appended uplink (a supplementary uplink) etc.) uplink BWPs for the terminal apparatus 1. Furthermore, the network may set an additional uplink BWP and an additional downlink BWP for a certain serving cell. The BWP setting is divided into uplink parameters and downlink parameters. In addition, the BWP setting is divided into common parameters and dedicated parameters. The common parameters (a BWP uplink common IE, a BWP downlink common IE, etc.) are specific to cells. Common parameters of an initial BWP of the primary cell are also provided by system information. For all other serving cells, the network provides common parameters through dedicated signals. The BWP is identified by a BWP ID. The BWP ID of the initial BWP is 0. The BWP IDs of other BWPs take values from 1 to 4.

An initial DL BWP may be defined by a PRB location of a control resource set (CORESET) used for a type0-PDCCH common search space, the number of consecutive PRBs, a subcarrier interval, and a cyclic prefix. That is, the initial DL BWP may be set according to pdcch-ConfigSIB1 included in MIB or PDCCH-ConfigCommon included in ServingCell-CongfigCommon. The information element ServingCell-CongfigCommon is used to set a cell-specific parameter for the serving cell of the terminal apparatus 1. In this case, the size of the initial DL BWP is $N^{size}_{BWP, 0}$. That is, the $N^{size}_{BWP, 0}$ is the number of resource blocks representing the bandwidth of the initial DL BWP. Here, the initial DL BWP is the initial DL BWP in the size of $N^{size}_{BWP, 0}$ (the first size).

In addition, the initial DL BWP may also be provided to the terminal apparatus 1 according to SIB1 (systemInformationBlockType1) or ServingCellCongfigCommon (for example, ServingCellConfigCommonSIB). The information element ServingCellCongfigCommonSIB is used to set a cell-specific parameter for the serving cell of the terminal apparatus 1 in the SIB1. In this case, the size of the initial DL BWP is $N^{size}_{BWP, 1}$. In other words, the $N^{size}_{BWP, 1}$ is the number of resource blocks of the BWP indicated by the SIB1 (SystemInformationBlockType1) or the ServingCell-ConfigCommon. The $N^{size}_{BWP, 1}$ may be equal to the $N^{size}_{BWP, 0}$. The $N^{size}_{BWP, 1}$ may also be different from the $N^{size}_{BWP, 0}$. Here, the initial DL BWP is the initial DL BWP in the size of $N^{size}_{BWP, 1}$ (the second size).

An initial ULBWP may also be provided to the terminal apparatus 1 according to the SIB1 (systemInformationBlockType1) or initialUplinkBWP. The information element initialUplinkBWP is used to set the initial UL BWP.

As described above, a plurality of DL BWPs may be set for the terminal apparatus 1. Furthermore, in the DL BWP set for the terminal apparatus 1, a default DL BWP can be set by a higher layer parameter defaultDownlinkBWP-Id. If the higher layer parameter defaultDownlinkBWP-Id is not provided to the terminal apparatus 1, the default DL BWP is the initial DL BWP. Here, the initial DL BWP is the initial DL BWP in the second size.

In the present implementation manner, as long as it is not explicitly stated, the initial DL BWP may be the initial DL BWP of $N^{size}_{BWP, 0}$, or the initial DL BWP of $N^{size}_{BWP, 1}$.

One primary cell and a maximum of 15 secondary cells may be set in the terminal apparatus 1.

The control resource set (CORESET) of the present implementation manner will be described below.

A Control resource set (CORESET) is time and frequency resources used to search for downlink control information. Setting information of the CORESET includes information for determining an identifier of the CORESET (ControlResourceSetId, CORESET-ID) and a frequency resource of the CORESET. The information element ControlResourceSetId (the identifier of the CORESET) is used to determine a control resource set in a certain serving cell. The identifier of the CORESET is used between BWPs in a certain serving cell. The identifier of the CORESET is unique among the BWPs in the serving cell. The number of CORESETs, including the initial CORESET, for various BWPs is limited to 3. A value of the identifier of the CORESET in a certain serving cell takes a value from 0 to 11.

A control resource set determined by a CORESET identifier 0 (ControlResourceSetId 0) is referred to as a CORESET #0. The CORESET #0 may be set according to pdcch-ConfigSIB1 included in the MIB or PDCCH-ConfigCommon included in the ServingCellCongfigCommon. That is, the setting information of the CORESET #0 may be the pdcch-ConfigSIB1 included in the MIB or the PDCCH-ConfigCommon included in the ServingCellCongfigCommon. The setting information of the CORESET #0 may be set according to controlResourceSetZero included in the PDCCH-ConfigSIB1 or PDCCH-ConfigCommon. In other words, the information element controlResourceSetZero is used to indicate the CORESET #0 (the common CORESET) of the initial DL BWP. The CORESET indicated by the pdcch-ConfigSIB1 is the CORESET #0. The information element pdcch-ConfigSIB1 in the MIB or dedicated configuration is used to set the initial DL BWP. The setting information pdcch-ConfigSIB1 of the CORESET for the CORESET #0 does not include information that clearly determines an identifier of the CORESET, and the frequency resources (for example, the number of consecutive resource blocks) and time resources (the number of consecutive symbols) of the CORESET. However, the frequency resources (for example, the number of consecutive resource blocks) and time resources (the number of consecutive symbols) of the CORESET for the CORESET #0 can be implicitly determined according to information included in the pdcch-ConfigSIB1. The information element PDCCH-ConfigCommon is used to set a cell-specific PDCCH parameter provided in the SIB. In addition, the PDCCH-ConfigCommon may also be provided during switching and addition of the PSCell and/or Scell. The setting information of the CORESET #0 is included in the setting of the initial BWP. That is, the setting information of the CORESET #0 may not be included in the setting of BWPs other than the initial BWP. The controlResourceSetZero corresponds to 4 bits (for example, 4 bits of the MSB, 4 bits of the most significant bits) in the pdcch-ConfigSIB1. The CORESET #0 is a control resource set for a type0-PDCCH common search space.

The setting information of the additional common CORESET (additional common control resource set) may be set according to commonControlResourceSet included in the PDCCH-ConfigCommon. The setting information of the additional common CORESET may be used to specify the additional common CORESET used in the random access procedure. In addition, the setting information of the additional common CORESET may also be used to specify an SI message (for example, system information other than the SIB1) and/or the additional common CORESET used in a paging procedure. The setting information of the additional common CORESET may be included in settings of various BWPs. The identifier of the CORESET indicated by the commonControlResourceSet takes a value other than 0.

The common CORESET may be a CORESET (for example, an additional common CORESET) used in the random access procedure. In addition, in the present implementation manner, the common CORESET may include a CORESET set in the setting information of the CORESET #0 and/or the additional common CORESET. In other words, the common CORESET may include the CORESET #0 and/or the additional common CORESET. The CORESET #0 may also be referred to as a common CORESET #0. Even in BWPs other than the BWP set with the common CORESET, the terminal apparatus 1 can refer to (acquire) the setting information of the common CORESET.

Setting information of one or a plurality of CORESETs may be set according to PDCCH-Config. The information element PDCCH-Config is used to set a UE-specific PDCCH parameter (for example, CORSET, search space, etc.) for a certain BWP. The PDCCH-Config may be included in the settings of various BWPs.

That is, in the present implementation manner, the setting information of the common CORESET indicated by the MIB is the pdcch-ConfigSIB1, the setting information of the common CORESET indicated by the PDCCH-ConfigCommon is the controlResourceSetZero, and the setting information of the common CORESET (the additional common CORESET) indicated by the PDCCH-ConfigCommon is the commonControlResourceSet. In addition, the setting information of one or a plurality of CORESETs (UE specifically configured Control Resource Sets, UE specific CORESETs) indicated by the PDCCH-Config is controlResourceSetToAddModList.

The search space is defined as being used to search for PDCCH candidates. The searchSpaceType included in the setting information of the search space represents that the search space is a Common Search Space (CSS) or a UE-specific Search Space (USS). The UE-specific search space is deduced at least from a value of the C-RNTI set by the terminal apparatus 1. That is, the UE-specific search space is deduced separately for each terminal apparatus 1. The common search space is a search space common among a plurality of terminal apparatuses 1 and is composed of a preset index Control Channel Element (CCE). The CCE is composed of a plurality of resource elements. The setting information of the search space includes information of a DCI format monitored in the search space.

The setting information of the search space includes the identifier of the CORESET determined by the setting information of the CORESET. The CORESET determined by the identifier of the CORESET included in the setting information of the search space establishes an association with the search space. In other words, the CORESET that establishes an association with the search space is the CORESET determined by the identifier of the CORESET included in the search space. The DCI format indicated by the setting information of the search space is monitored in the CORESET that establishes an association. Each search space establishes an association with a CORESET. For example, the setting information of the search space used in the random access procedure may be set according to ra-SearchSpace. That is, the DCI format with an additional CRC scrambled by the RA-RNTI or TC-RNTI is monitored by the CORESET that establishes an association with the ra-SearchSpace.

As described above, the setting information of the CORESET #0 is included in the setting of the initial DL BWP. The setting information of the CORESET #0 may not be included in the setting of the BWP (additional BWP) other than the initial DL BWP. In the case that the BWP (additional BWP) other than the initial DL BWP refers to (acquires, etc.) the setting information of the CORESET #0, it may be necessary to at least meet that the CORESET #0 in the frequency domain and the SS block are included in the additional BWP, and the same subcarrier interval is used. In other words, in the case that the BWP (additional BWP) other than the initial DL BWP refers to (or acquires, etc.) the setting information of the CORESET #0, it may be necessary to at least meet that the bandwidth of the initial DL BWP in the frequency domain and the SS block are included in the additional BWP, and the same subcarrier interval is used. At this time, the search space (for example, the ra-SearchSpace) set for the additional BWP can refer to (or acquire, etc.) the setting information of the CORESET #0 by indicating the identifier 0 of the CORESET #0. That is, at this time, only the initial DL BWP is set with the CORESET #0, but the terminal apparatus 1 operating in another BWP (additional BWP) can refer to the setting information of the CORESET #0. In addition, in the case of failing to meet any of conditions that the bandwidth of the initial DL BWP in the frequency domain is included in the additional DL BWP, the SS block is included in the additional DL BWP, and the same subcarrier interval is used, the terminal apparatus 1 may not expect that the additional DL BWP refers to the setting information of the CORESET #0. That is, in this case, the base station apparatus 3 may not set for the terminal apparatus 1 that the additional DL BWP refers to the setting information of the CORESET #0. Here, the initial DL BWP may be the initial DL BWP in the size of $N^{size}_{BWP,\,0}$ (first size).

In the case that a certain (additional) DL BWP refers to (or acquires, etc.) the setting information of the CORESET of another BWP, it may be necessary to meet at least that the CORESET in the frequency domain (or the bandwidth of the BWP) and/or the SS block included in (associated with) the BWP is included in the additional BWP, and the same subcarrier interval is used. In other words, in the case of failing to meet any of that the CORESET in the frequency domain (or the bandwidth of the BWP) is included in the additional DL BWP, the SS block included in (associated with) the BWP is included in the additional DL BWP, and the same subcarrier interval is used, the terminal apparatus 1 may not expect that the additional DL BWP refers to the setting information of the CORESET set for the BWP.

The terminal apparatus 1 monitors collections of PDCCH candidates in one or a plurality of CORESETs configured in various activated serving cells set for monitoring the PDCCHs. The collections of PDCCH candidates correspond to one or a plurality of search space sets. The monitoring refers to decoding the various PDCCH candidates according to one or a plurality of monitored DCI formats. The collections of PDCCH candidates monitored by the terminal apparatus 1 are defined as PDCCH search space sets. A search space set is a common search space set or a UE-specific search space set. In the above illustration, the search space set is referred to as a search space, the common search space set is referred to as a common search space, and the UE-specific search space set is referred to as a UE-specific search space. The terminal apparatus 1 monitors the PDCCH candidates in one or a plurality of following search space sets.

Type0-PDCCH common search space set: The search space set is set based on searchSpaceZero indicated by the MIB or searchSpaceSIB1 indicated by the PDCCH-ConfigCommon that is regarded as a higher layer parameter. The search space may be used to monitor the DCI format of the CRC scrambled by the SI-RNTI in the primary cell. In addition, the search space is used to monitor the DCI format of the CRC scrambled by the SIB1-RNTI in the primary cell.

Type0A-PDCCH common search space set: The search space set is set according to searchSpace-OSI (searchSpaceOtherSystemInformation) indicated by the PDCCH-ConfigCommon and regarded as the higher layer parameter. The search space is used to monitor the DCI format of the CRC scrambled by the SI-RNTI in the primary cell.

Type1-PDCCH common search space set: The search space set is set according to the ra-SearchSpace for the random access procedure indicated by the PDCCH-ConfigCommon and regarded as the higher layer parameter. The search space is used to monitor the DCI format of the CRC scrambled by the RA-RNTI or TC-RNTI in the primary cell. The Type1-PDCCH common search space set is a search space set used for the random access procedure.

Type2-PDCCH common search space set: The search space set is set according to a search space (pagingSearchSpace) for the paging procedure indicated by the PDCCH-ConfigCommon and regarded as the higher layer parameter. The search space is used to monitor the DCI format of the CRC scrambled by the P-RNTI in the primary cell.

Type3-PDCCH common search space set: The search space set is set according to a SearchSpace with a common search space type indicated by the PDCCH-Config and regarded as the higher layer parameter. The search space is used to monitor the DCI format of the CRC scrambled by INT-RNTI, SFI-RNTI, TPC-PUSCH-RNTI, TPC-PUCCH-RNTI, or TPC-SRS-RNTI. It is used to perform monitoring on the DCI format of the CRC scrambled by the C-RNTI or CS-RNTI(s) for the primary cell.

UE-specific search space set: The search space set is set according to a SearchSpace with a UE specific search space type indicated by the PDCCH-Config and regarded as the higher layer parameter. The search space is used to monitor the DCI format of the CRC scrambled by the C-RNTI or CS-RNTI(s).

In the case that if the terminal apparatus 1 is provided with one or a plurality of search space sets according to the corresponding higher layer parameter (searchSpaceZero, searchSpaceSIB1, searchSpaceOtherSystemInformation, pagingSearchSpace, ra-SearchSpace, etc.), and the terminal apparatus 1 is provided with the C-RNTI or CS-RNTI, the terminal apparatus 1 can monitor the PDCCH candidates for the DCI format 0_0 and DCI format 1_0 with the C-RNTI or CS-RNTI in the one or a plurality of search space sets.

In the present implementation manner, the number of bits in the frequency domain resource block field included in the DCI format scrambled by the C-RNTI or CS-RNTI is deduced by an (Equation 4) Ceiling($\log_2(N^{DL, BWP}_{RB}(N^{DL, BWP}_{RB}+1)/2)$). The DCI format is monitored in the UE-specific search space set, and (1) the total number of different DCI sizes monitored in each slot for a certain cell is 4 or less, and (2) in the case that the total number of different DCI sizes of the C-RNTI (and/or CS-RNTI) monitored according to each slot for a certain cell is 3 or less, the $N^{DL, BWP}_{RB}$ is the size of the active DL BWP. In a case other than this one, the $N^{DL, BWP}_{RB}$ is the second size of the initial DL BWP. However, in the case that the DCI format scrambled by the C-RNTI is monitored in the type0-PDCCH common search space set indicated by the higher layer parameters (searchSpaceZero, searchSpaceSIB1), the $N^{DL, BWP}_{RB}$ is in the first size of the initial DL BWP.

The type0-PDCCH common search space set may only establish an association with the CORESET #0. The searchspaceSIB1 is used for the search space for an SIB1 message. The searchSpaceZero corresponds to the 4 bits in the pdcch-ConfigSIB1 (for example, 4 bits of the LSB, and 4 bits of the least significant bits). The type0-PDCCH common search space set has a search space index 0.

As described above, the terminal apparatus 1 monitors the DCI format that schedules the SIB1 in the type0-PDCCH common search space set. The terminal apparatus 1 monitors the DCI format that schedules an SI message (other system information, such as an SIB2 and an SIB after the SIB2) in the type0A-PDCCH common search space set. In addition, in the case that the higher layer parameter searchSpaceOtherSystemInformation is not provided to the terminal apparatus 1, establishing an association between PDCCH monitoring occasions for the type0A-PDCCH common search space set and an SS/PBCH block index may be the same as establishing an association between PDCCH monitoring occasions for the type0-PDCCH common search space set and the SS/PBCH block index.

The PDCCH transmission for the SIB1 and the PDCCH transmission for the SI message may overlap each other. The overlapping may mean that resources for first transmission and resources for second transmission are superposed partially or completely in the time domain (for example, symbols) and the frequency domain.

In the present implementation manner, the DCI format 1_0 that schedules the system information (the SIB1 and/or SI message) may be added with a CRC parity bit scrambled by the SI-RNTI. Here, the SI-RNTI is used to broadcast the system information. Furthermore, when the PDCCH transmission for the SIB1 overlaps the PDCCH transmission for the SI message, the terminal apparatus 1 may monitor the PDCCH for the SIB1, or may not expect (monitor) transmission of the PDCCH for the SI message. In addition, in the case that the PDCCH transmission for the SIB1 overlaps the PDCCH transmission for the SI message, the terminal apparatus 1 may try decoding using the PDCCH for the SIB1, and monitor the PDCCH for the SI message when the PDCCH for the SIB1 is not detected.

In the case that the PDCCH transmission for the SIB1 overlaps the PDCCH transmission for the SI message, the terminal apparatus 1 may monitor the PDCCH by using the size of the DCI format for the type0-common search space.

In the present implementation manner, the DCI format that schedules the SIB1 may be added with a CRC parity bit scrambled by the SIB1-RNTI. The DCI format that schedules the SI message may be added with a CRC parity bit scrambled by the SI-RNTI. In other words, the SIB1-RNTI is used to broadcast the system information of the SIB1. The SI-RNTI is used to broadcast the system information other than the SIB1.

Moreover, the DCI format 1_0 includes a frequency domain resource assignment field. Bits in the field are given based on the size of the DL BWP. Specifically, the number of bits in the field is calculated (deduced) by the (Equation 4) Ceiling($\log_2(N^{DL, BWP}_{RB}(N^{DL, BWP}_{RB}+1)/2)$). Here, the $N^{DL, BWP}_{RB}$ is the number of resource blocks representing the bandwidth of the DL BWP. The frequency domain resource assignment field included in the DCI format 1_0 scrambled by the SIB1-RNTI is determined according to the first size of the initial DL BWP. In other words, the $N^{DL, BWP}_{RB}$ is the first size of the initial DL BWP.

In addition, the frequency domain resource assignment field included in the DCI format 1_0 scrambled by the SI-RNTI may be determined according to the second size of the initial DL BWP. In other words, the $N^{DL, BWP}_{RB}$ is the second size of the initial DL BWP. However, in the case of monitoring the DCI format 1_0 scrambled by the SIB1-RNTI and the DCI format 1_0 scrambled by the SI-RNTI in the same CORESET (for example, the CORESET #0), the size of the DCI format 1_0 scrambled by the SIB1-RNTI is the same as the size of the DCI format 1_0 scrambled by the SI-RNTI. In other words, in this case, the frequency domain resource assignment field included in the DCI format 1_0 scrambled by the SI-RNTI may be determined according to the first size of the initial DL BWP.

In the present implementation manner, in the case that the PDCCH transmission for the SIB1 overlaps the PDCCH transmission for the SI message, the terminal apparatus 1 may monitor the PDCCH by using the size of the DCI format scrambled by the SIB-RNTI.

The setting information of the BWP is divided into setting information of the DL BWP and setting information of the UL BWP. The setting information of the BWP includes an information element bwp-Id (the identifier of the BWP). The identifier of the BWP included in the setting information of the DL BWP is used to determine (refer to) the DL BWP in a certain serving cell. The identifier of the BWP included in the setting information of the UL BWP is used to determine (refer to) the UL BWP in a certain serving cell. The DL BWP and UL BWP are granted with the identifier of the BWP, respectively. For example, the identifier of the BWP corresponding to the DL BWP may also be referred to as a DL BWP index. The identifier of the BWP corresponding to the UL BWP may also be referred to as a UL BWP index. The initial DL BWP is referred to by the identifier 0 of the DL BWP. The initial UL BWP is referred to by the identifier 0 of the UL BWP. Other DL BWPs or other UL BWPs may be referred to by identifiers 1 to max NrofBWPs of the BWPs, respectively. In other words, the identifier of the BWP set to 0 (bwp-Id=0) establishes an association with the initial BWP, and cannot be used for other BWPs. The max NrofBWPs is the maximum number of BWPs of each serving cell, which is 4. That is, values of the identifiers of other BWPs take values of 1 to 4. The setting information of another higher layer uses the identifier of the BWP to establish an association with the determined BWP. The DL BWP and the UL BWP having the same BWP identifier may mean that the DL BWP and the UL BWP are paired.

Figure 7:
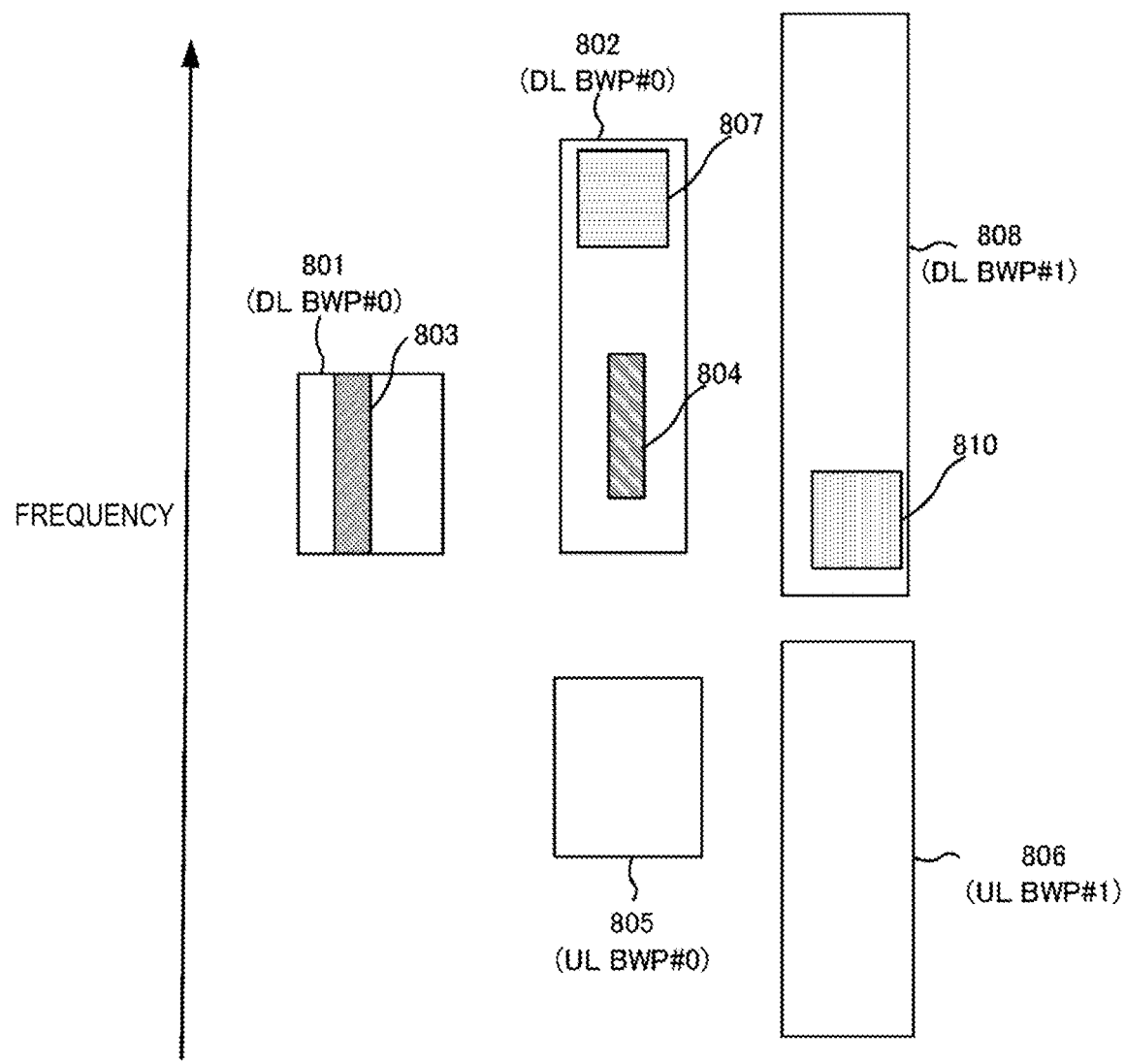
FIG. 7 is a diagram showing an example of BWP setting according to an implementation manner of the present invention.

FIG. 7 is a diagram showing an example of BWP setting according to an implementation manner of the present invention.

One initial BWP at least including one DL BWP and one UL BWP is set for each serving cell. Furthermore, an additional BWP (additional UL BWP and/or additional DL BWP) may be set for a certain serving cell. The number of additional BWPs may be set up to four. However, in one serving cell, there is one active DL BWP and one active UL BWP.

In FIG. 7, in a certain serving cell, two initial DL BWPs (BWP #0) and one additional BWP (BWP #1) may be set for the terminal apparatus 1. 801 is the initial DL BWP (DL BWP #0) in the first size ($N^{size}_{BWP, 0}$). The first size may be given according to the MIB. The initial DL BWP in the first size may be defined by the PRB location of the control resource set (CORESET) used for the type0-PDCCH common search space, the number of consecutive PRBs, the subcarrier interval, and the cyclic prefix. In other words, the first size of the initial DL BWP may be resource blocks configuring the CORESET #0 (803). 802 is the initial DL BWP (DL BWP #0) in the second size ($N^{size}_{BWP, 1}$). The second size is the number of consecutive resource blocks, which may be indicated by the SIB1 (systemInformationBlockType1). The initial DL BWP in the second size may have the same PRB start location as the initial DL BWP in the first size. In other words, the initial DL BWP in the first size, the initial DL BWP in the second size, and the CORESET #0 may have the same start PRB location. In addition, the initial DL BWP in the second size may have the same start PRB location as the initial DL BWP in the first size. In addition, the initial DL BWP in the second size may not have the same PRB start location as the initial DL BWP in the first size. The initial DL BWP in the second size includes the initial DL BWP in the first size in the frequency domain.

The CORESET #0 (803) is a common CORESET having an identifier 0 and set for the initial DL BWP. Here, the initial DL BWP may be the initial DL BWP in the first size or the initial DL BWP in the second size. 804 is an additional common CORESET set for the initial DL BWP in the second size. 807 is a CORESET set for the initial DL BWP #0 in the second size. 810 is a CORESET set for the additional BWP #1. 807 and 810 may also be referred to as UE-specific CORESETs (UE specifically configured Control Resource Sets). As described above, setting information of the CORESET #0 (803) may be set according to the pdcch-ConfigSIB1 or PDCCH-ConfigCommon. Setting information of the additional common CORESET (804) may be set according to the commonControlResourceSet included in the PDCCH-ConfigCommon. Setting information of the CORESETs (807 and 810) may be set according to the controlResourceSetToAddModList included in the PDCCH-Config. A value of the identifier of the CORESET 803 is given as 0. A value of the identifier of the CORESET 804 may also be given as a value other than 0.

For example, in FIG. 7, if it is assumed that a DL BWP #1 is activated and an UL BWP #0 is activated, a DL BWP #0 and an UL BWP #1 are inactive BWPs. In this case, the activated DL BWP #1 may also be referred to as an active DL BWP (a current active DL BWP). The activated initial UL BWP #0 may also be referred to as an initial active UL BWP. The terminal apparatus 1 performs downlink reception in the active DL BWP #1, and activates uplink transmission in the initial active UL BWP.

Resource allocation in the frequency domain will be described below.

In the present implementation manner, a downlink resource allocation type 0 and a downlink resource allocation type 1 are supported in a downlink resource allocation solution. The downlink resource allocation type 0 or type 1 represents the allocation of virtual resource blocks.

In the Downlink resource allocation type 0 (downlink type 0 resource allocation), resource block assignment information includes bit mapping of Resource Block Groups (RBGs) allocated to the terminal apparatus 1. A frequency domain resource assignment field included in the DCI format represents the resource block assignment information. The resource block assignment may also be referred to as resource assignment. The base station apparatus 3 allocates resources to the terminal apparatus 1 in the DL BWP to which the resource block assignment is applied, for generating the bit mapping. The terminal apparatus 1 determines the DL BWP to which the resource block assignment is applied, and determines the resource allocation based on the bit mapping in the determined DL BWP. Here, the resource block group is a collection of consecutive virtual resource blocks, which may be defined by a higher layer parameter.

In the downlink resource allocation type 1, the resource block assignment information represents a collection of non-interleaved or interleaved virtual resource blocks consecutively allocated to the scheduled terminal apparatus 1 in a certain DL BWP. Here, the size $N^{size}_{BWP}$ may be the number of resource blocks representing the bandwidth of the active DL BWP. Here, the DL BWP is the DL BWP to which the resource block assignment is applied. The base station apparatus 3 allocates resources to the terminal apparatus 1 in the DL BWP to which the resource block assignment is applied.

When resource allocation is determined based on the resource block assignment information, the terminal apparatus 1 needs to first determine the DL BWP to which the resource block assignment is applied. In other words, when detecting the PDCCH used by the terminal apparatus 1, the terminal apparatus 1 first determines the DL BWP, and then determines the resource allocation in the determined DL BWP. Here, the determined DL BWP means the DL BWP to which the resource block assignment (resource block assignment information) is applied. That is, the terminal apparatus 1 needs to determine whether to apply the resource block assignment information indicated by the DCI format to any DL BWP of the DL BWPs set in the terminal apparatus 1.

The terminal apparatus 1 uses the downlink type 1 resource allocation when receiving the DCI format 1_0. The type of the PDCCH common search space in which the DCI format 1_0 is used to schedule the PDSCH (PDSCH of Case 1) is unrelated to which BWP is the active DL BWP, and resource block number labeling (RB Indexing) for resource allocation is starting from the lowest RB that receives the CORESET in the DCI format 1_0. For example, in non-interleaved VRB/PRB mapping, for a PDSCH scheduled by the DCI format 1_0 in a certain common search space set, a virtual resource block n indicated by downlink resource allocation is mapped to a physical resource block n+$N^{CORESET}_{start}$. Here, the $N^{CORESET}_{start}$ is the lowest-numbered physical resource block that receives the CORESET in the DCI format 1_0.

For PDSCHs other than the PDSCH in the above Case 1, in the case that a BWP indicator field (bandwidth part indicator field) is not set for the DCI format that schedules the PDSCH, the resource block number labeling used for resource allocation of downlink type 0 and type 1 is determined in the active DL BWP of the terminal apparatus 1. In other words, the active DL BWP is a DL BWP to which the resource block assignment is applied. It is determined in the active DL BWP that the resource block number labeling is the number labeling of resource allocation starting from the lowest number (a physical resource block index 0) of the physical resource block of the active DL BWP. For example, in the non-interleaved VRB/PRB mapping, the virtual resource block n indicated by the downlink resource allocation is mapped to the physical resource block n of the active DL BWP.

If a BWP indicator field (bandwidth part indicator field) is set for the DCI format that schedules the PDSCH, the resource block number labeling used for resource allocation of the downlink type 0 and type 1 is determined in the BWP indicated by a value of the BWP indicator field. In other words, the DL BWP to which the resource block assignment is applied is the DL BWP indicated by the value of the BWP indicator field. In other words, the base station apparatus 3 allocates resources to the terminal apparatus 1 in the DL BWP indicated by the value of the BWP indicator field, for generating a resource block assignment. The terminal apparatus 1 determines, using the value of the BWP indicator field, the DL BWP to which the resource block assignment is applied, and determines the resource allocation in the determined DL BWP based on the resource block assignment information.

In the case that the DCI format 1_0 is detected in the type0-PDCCH common search space set in the CORESET #0, the size $N^{size}_{BWP}$ is the first size of the initial DL BWP.

The Downlink resource allocation type 1 (downlink type 1 resource allocation) will be described below.

Figure 8:
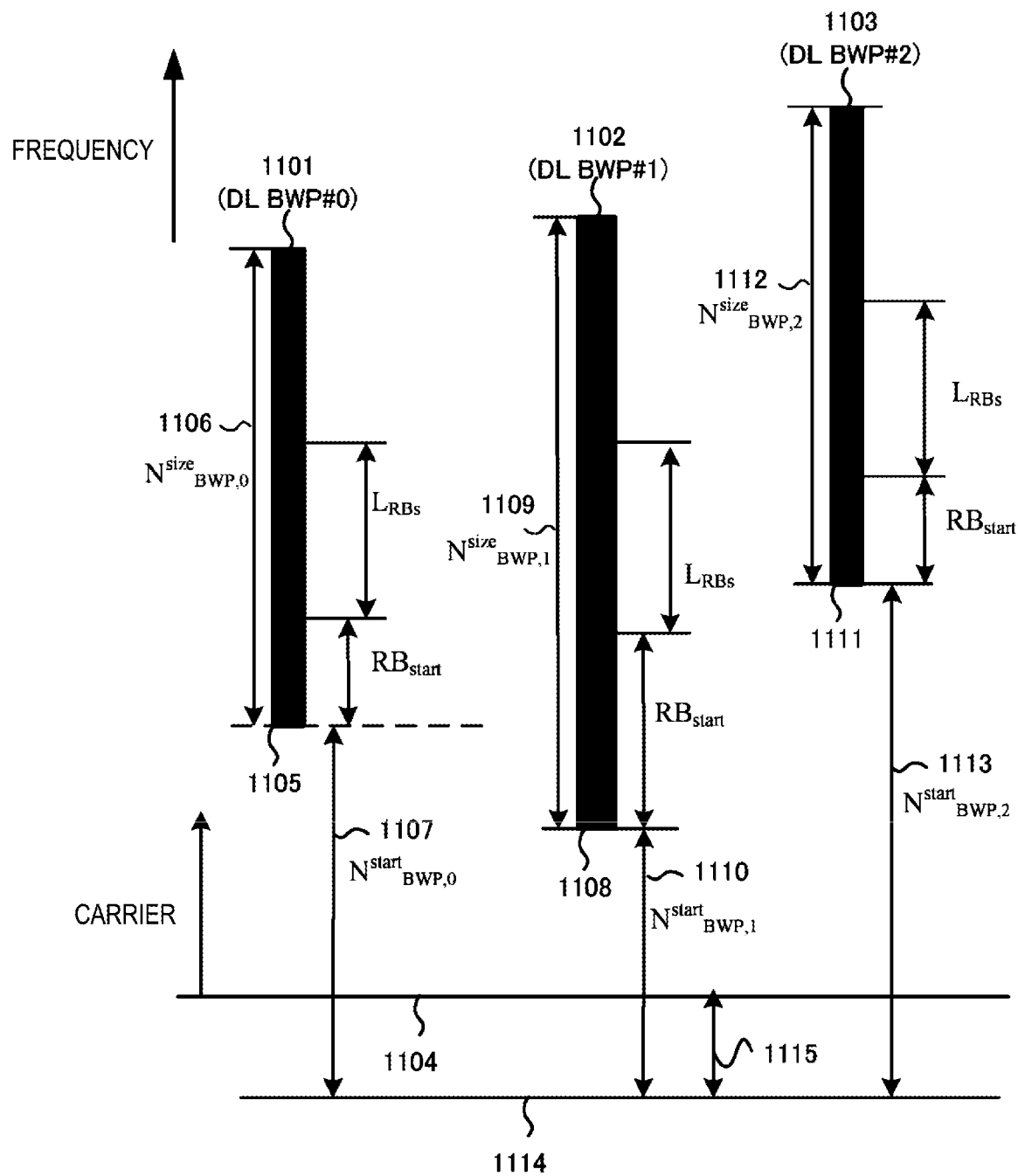
FIG. 8 is a diagram showing an example illustrating an uplink resource allocation type 1 for a BWP according to an implementation manner of the present embodiment.

FIG. 8 is a diagram illustrating an example of the downlink resource allocation type 1 for a BWP.

In FIG. 8, one initial DL BWP (1101) and two additional DL BWPs (1102 and 1103) are set in the terminal apparatus 1. As described above, a common resource block $n_{PRB}$ is a resource block of which a number is labeled in ascending order starting from 0 in each subcarrier interval setting μ starting from a point A. In other words, 1114 is a common resource block with a labeled number 0 (common resource block 0). In the subcarrier interval setting μ, the center of a subcarrier index 0 of the common resource block 0 (common resource block index 0, $n_{CRB}$ #0) is consistent with the point A. 1104 is a start location of the carrier in the subcarrier interval setting μ, and is given by a higher layer parameter OffsetToCarrier. In other words, the higher layer parameter OffsetToCarrier is an offset in the frequency domain between the point A and the lowest subcarrier that can be used by the carrier. The offset (1115) represents the number of resource blocks in the subcarrier interval setting μ. That is, when the subcarrier interval setting μ varies, the frequency band of the frequency domain of the offset is different. In the subcarrier interval setting μ, 1104 may be the location of the resource block where the carrier starts. Physical resource blocks are resource blocks labeled with numbers in ascending order from 0 for each BWP. In the subcarrier interval setting μ of each BWP index I, a relationship between the physical resource block $n_{PRB}$ in the BWP index I and the common resource block $n_{CRB}$ is given by an (Equation 3) $n_{CRB}=n_{PRB}+N^{start}_{BWP,i}$. In the subcarrier interval setting μ of each BWP, the $N^{start}_{BWP,I}$ is the number of common resource blocks starting from the BWP index I for the common resource block index 0. The $N^{size}_{BWP,I}$ is the number of resource blocks representing the bandwidth of the BWP of the index I in the subcarrier interval setting μ of the BWP index i.

The frequency domain location and bandwidth of the BWP are given by a higher layer parameter locationAndBandwidth. Specifically, a first physical resource block (a physical resource block index 0) of the BWP index I and the number of consecutive physical resource blocks are given by the higher layer parameter locationAndBandwidth. A value indicated by the higher layer parameter locationAndBandwidth is interpreted as a value of an RIV for the carrier. As shown in (A) of FIG. 9, $N^{size}_{BWP}$ is set to 275. Furthermore, $RB_{start}$ and $L_{RBs}$ identified according to the value of the RIV represent the first physical resource block (physical resource block index 0) of the BWP and the number of consecutive physical resource blocks representing the bandwidth of the BWP. The first physical resource block of the BWP index I is a physical resource block offset relative to the physical resource block (1104) indicated by the higher layer parameter OffsetToCarrier. The number of resource blocks representing the bandwidth of the BWP index I is the $N^{size}_{BWP, i}$. The $N^{start}_{BWP, I}$ of the BWP index I is given according to the offset indicated by the first physical resource block of the BWP index I and the higher layer parameter OffsetToCarrier.

That is, in FIG. 8, in the subcarrier interval setting μ of the DL BWP #0, 1105 is the physical resource block index 0 ($n_{PRB}$ #0) in the DL BWP #0 (1101). A relationship between the physical resource block in the DL BWP #0 and the common resource block is given by $n_{CRB}=n_{PRB}+N^{start}_{BWP, 0}$. In the subcarrier interval setting μ of the DL BWP #0, the $N^{start}_{BWP, 0}$ (1107) is the common resource block starting from the DL BWP #0 for the common resource block index 0. The $N^{size}_{BWP, 0}$ (1106) is the number of resource blocks representing the bandwidth of the UL BWP #0 in the subcarrier interval setting μ of the UL BWP #0.

In FIG. 8, in the subcarrier interval setting μ of a DL BWP #1, 1108 is the physical resource block index 0 ($n_{PRB}$ #0) in the DL BWP #1 (1102). A relationship between the physical resource block in the DL BWP #1 and the common resource block is given by $n_{CRB}=n_{PRB}+N^{start}_{BWP, 1}$. In the subcarrier interval setting μ of a UL BWP #1, the $N^{start}_{BWP, 1}$ (1110) is the common resource block starting from the DL BWP #1 for the common resource block index 0. The $N^{size}_{BWP, 1}$ (1109) is the number of resource blocks representing the bandwidth of the DL BWP #0 in the subcarrier interval setting μ of the UL BWP #1.

In FIG. 8, in the subcarrier interval setting μ of a DL BWP #2, 1111 is the physical resource block index 0 ($n_{PRB}$ #0) in a UL BWP #2 (1102). A relationship between the physical resource block in the DL BWP #2 and the common resource block is given by $n_{CRB}=n_{PRB}+N^{start}_{BWP, 2}$. In the subcarrier interval setting μ of the DL BWP #2, the $N^{start}_{BWP, 2}$ (1113) is the common resource block starting from the UL BWP #2 for the common resource block index 0. The $N^{size}_{BWP, 2}$ (1112) is the number of resource blocks representing the bandwidth of the DL BWP #2 in the subcarrier interval setting μ of the DL BWP #2.

As seen from FIG. 8, various BWPs set in the terminal apparatus 1 have different start locations (start common resource blocks, $N^{start}_{BWP}$) and different numbers of resource blocks ($N^{size}_{BWP}$). When interpreting the RIV indicated by the bits in the resource assignment field, the terminal apparatus 1 needs to determine the DL BWP to which the resource assignment is applied. That is, the terminal apparatus 1 can determine the DL BWP to which the resource assignment is applied, interpret the RIV based on the $N^{size}_{BWP, 1}$ of the determined DL BWP, and calculate the start virtual resource block ($RB_{start}$) and the number ($L_{RBs}$) of consecutively allocated resource blocks. The calculated $RB_{start}$ represents the start location of the resource allocated on the basis of the physical resource block index 0 of the DL BWP to which the resource assignment is applied. For example, even if the calculated value of the $RB_{start}$ is the same, when the DL BWP to which the resource assignment is applied varies, the location of the start common resource block is also different.

In addition, when the size $N^{size}_{BWP}$ of the DL BWP to which the resource assignment is applied varies, the number of bits in the resource assignment indicating the value of the RIV is also different. The bits in the resource block assignment field indicating the value of the RIV are given by Ceiling($\log_2(N^{size}_{BWP}(N^{size}_{BWP}+1)/2)$). In other words, the terminal apparatus 1 needs to first determine the DL BWP to which the resource assignment is applied.

As described above, in the downlink resource allocation type 1, the resource block assignment information represents a collection of non-interleaved or interleaved virtual resource blocks that are consecutively allocated to the scheduled terminal apparatus 1 in the active BWP in the size of $N^{size}_{BWP}$. Here, the size $N^{size}_{BWP}$ may be the number of resource blocks representing the bandwidth of the active DL BWP. In the case that the DCI format 1_0 is detected in the type0-PDCCH common search space set in the CORESET #0, the size $N^{size}_{BWP}$ is the first size of the initial DL BWP.

The downlink type 1 resource assignment field is composed of a Resource Indication Value (RIV) corresponding to the start resource block ($RB_{start}$, start virtual resource block) and the number ($L_{RBs}$) of consecutively allocated resource blocks. That is, the resource indication value RIV is shown in the resource assignment field. The $RB_{start}$ represents the start location of the allocated virtual resource block (start virtual resource block). The $L_{RBs}$ represents the number (length, size) of virtual resource blocks of the allocated resource. The resource indication value RIV represents the resource allocated to the DL BWP to which the resource assignment (resource assignment field) is applied. The terminal apparatus 1 first determines the UL BWP to which the resource assignment is applied, and then determines the resource allocation in the determined DL BWP. That is, the value of the RIV is calculated according to the size ($N^{size}_{BWP}$) of the DL BWP to which the resource assignment is applied, the start virtual resource block ($RB_{start}$), and the number ($L_{RBs}$) of consecutively allocated virtual resource blocks. In other words, the terminal apparatus 1 calculates the start location of the virtual resource block allocated in the DL BWP and the number of consecutively allocated virtual resource blocks based on the value of the RIV shown in the resource assignment field and the $N^{size}_{BWP}$. In other words, the terminal apparatus 1 interprets the bits in the resource assignment field to the DL BWP to which the resource assignment is applied. The base station apparatus 3 determines the DL BWP allocating the resource to the terminal apparatus 1, and generates the RIV based on the size of the determined DL BWP and the resource allocation (the start virtual resource block and the number of the consecutively allocated virtual resource blocks), and transmits the resource assignment including a bit string indicating the RIV to the terminal apparatus 1. The terminal apparatus 1 determines, based on the bit string of the resource assignment field, the resource block allocation in the frequency direction of the DL BWP (PDSCH) to which the resource assignment is applied.

FIG. 9 is a diagram showing an example of calculating the RIV.

In (A) of FIG. 9, the $N^{size}_{BWP}$ is the number of resource blocks representing the bandwidth of the active DL BWP. The value of the RIV is calculated based on the number $N^{size}_{BWP}$ of resource blocks representing the bandwidth of the initial BWP, the start virtual resource block (start location of the resource block) $RB_{start}$, and the number $L_{RBs}$ of consecutively allocated virtual resource blocks. The $RB_{start}$ is the start location of the virtual resource block for the active DL BWP. The $L_{RBs}$ is the number of consecutively allocated virtual resource blocks for the active BWP. Therefore, the allocated resource for the active BWP is determined according to the start location $RB_{start}$ of the resource block and the number $L_{RBs}$ of consecutively allocated virtual resource blocks. In the case that the DCI format is detected in the common search space set (for example, the type1-

PDCCH common search space set), the first size or the second size of the initial DL BWP is used for the $N^{size}_{BWP}$ in (A) of FIG. 9.

In (B) of FIG. 9, the $N^{initial}_{BWP}$ is the first size of the initial DL BWP. The $N^{active}_{BWP}$ is the number of resource blocks representing the bandwidth of the active DL BWP. The value of the RIV is calculated based on the number $N^{initial}_{BWP}$ of resource blocks representing the bandwidth of the initial BWP, the start location $RB'_{start}$ of the resource block, and the number $L'_{RBs}$ of consecutively allocated virtual resource blocks. The $RB'_{start}$ is the start location of the resource block for the initial BWP. The $L'_{RBs}$ is the number of consecutively allocated resource blocks for the initial BWP. The $RB'_{start}$ is multiplied by a coefficient K to obtain the $RB_{start}$. The $L'RBs$ is multiplied by the coefficient K to obtain the $L_{RBs}$. A value of the coefficient K is calculated based on the bandwidth of the initial BWP and the bandwidth of the active BWP. In the case that the $N^{active}_{BWP}$ is greater than the $N^{initial}_{BWP}$, the value of K is the maximum value meeting K<=Floor ($N^{active}_{BWP}/N^{initial}_{BWP}$) in a set {1, 2, 4, 8}. Here, a function Floor(A) outputs the maximum integer not greater than A. In the case that the $N^{active}_{BWP}$ is equal to or less than the $N^{initial}_{BWP}$, the value of K is 1. Therefore, the allocated resource for the active BWP is determined according to the start location $RB_{start}$ of the resource block and the number $L_{RBs}$ of consecutively allocated virtual resource blocks.

In a resource determination method in (B) of FIG. 9, the size of the DCI format in the USS (or the size of the frequency domain resource assignment field included in the DCI format) is deduced according to the first size of the initial DL BWP, but it may also be applied in the case of the active BWP. The DCI format may be the DCI format 1_0 and/or the DCI format 1_1.

In addition, in the resource determination method in (B) of FIG. 9, the size of the DCI format in the CSS (or the size of the frequency domain resource assignment field included in the DCI format) is deduced according to the first size of the initial DL BWP, but it may also be applied in the case of the initial DL BWP in the second size. The DCI format may be the DCI format 1_0.

In the present implementation manner, methods of determining the DL BWP to which the resource assignment is applied in the downlink type 1 resource allocation and determining the resource allocation will be described below. The base station apparatus 3 determines a DL BWP for performing resource allocation on the terminal apparatus 1, generates an RIV by using the size $N^{size}_{BWP}$ of the determined DL BWP, determines a bit string included in a frequency domain resource assignment field, and transmits a PDSCH frequency resource assignment to the terminal apparatus 1.

As a solution A of the present implementation manner, bits in the frequency domain resource assignment field included in a DCI format in a common search space set are deduced as a first size of an initial DL BWP. The resource assignment field (downlink type 1 resource allocation field) includes a resource indication value (RIV). The RIV corresponds to a certain start virtual resource block and the number of consecutively allocated virtual resource blocks. In other words, the RIV is defined (calculated) according to the size of the DL BWP, the start virtual resource block of the resource allocation, and the number of consecutively allocated virtual resource blocks.

In the present solution A, the terminal apparatus 1 may determine, based on (1) whether a search space set for performing decoding on the DCI format is a type0-PDCCH common search space set and/or (2) whether a CORESET that establishes an association with a search space for performing decoding on the DCI format is a CORESET #0, which one of the first size of the initial DL BWP, a second size of the initial DL BWP, and a third size of an active DL BWP is the size of the DL BWP used for calculating the RIV.

The terminal apparatus 1 may determine the first size of the initial DL BWP as the size of the DL BWP in the case that the search space set for performing decoding on the DCI format is the type0-PDCCH common search space set. Furthermore, the terminal apparatus 1 determines to generate the RIV by using the first size of the initial DL BWP for the $N^{size}_{BWP}$ in (A) of FIG. 9. In other words, the RIV is given according to the first size of the initial DL BWP, the $RB_{start}$, and the $L_{RBs}$. The terminal apparatus 1 may determine the resource block allocation in the frequency direction of the PDSCH based on a value of the RIV shown in the frequency domain resource assignment field.

In addition, for example, the terminal apparatus 1 may determine the second size of the initial DL BWP as the size of the DL BWP in the case that the search space set for performing decoding on the DCI format is a common search space set other than the type0-PDCCH common search space set. Furthermore, the terminal apparatus 1 determines the resource allocation by using the method in (B) of FIG. 9. That is, the $N^{initial}_{BWP}$ in (B) of FIG. 9 is the first size of the initial DL BWP. The $N^{active}_{BWP}$ is the second size of the initial DL BWP. The value of the RIV is given based on the first size $N^{initial}_{BWP}$ representing the initial BWP, a start virtual resource block $RB'_{start}$, and the number $L'_{RBs}$ of consecutively allocated virtual resource blocks. Furthermore, the start virtual resource block $RB_{start}$ of the resource allocation is a coefficient K times the start virtual resource block $RB'_{start}$. The number $L'_{RBs}$ of virtual resource blocks of the resource allocation is the coefficient K times the number $L'_{RBs}$ of virtual resource blocks. Furthermore, the terminal apparatus 1 may determine the resource block allocation in the frequency direction of the PDSCH based on the value of the RIV shown in the frequency domain resource assignment field. The active BWP for the terminal apparatus 1 may be the initial DL BWP in the second size, or may be an additional DL BWP.

In the present implementation manner, in the case that the $N^{active}_{BWP}$ is greater than the $N^{initial}_{BWP}$ in (B) of FIG. 9, a value of the coefficient K is the maximum value meeting K<=Floor($N^{active}_{BWP}/N^{initial}_{BWP}$) in a set {1, 2, 4, 8}. Here, the $N^{initial}_{BWP}$ is the first size of the initial DL BWP. The $N^{active}_{BWP}$ is the second size of the initial DL BWP. In addition, the $N^{active}_{BWP}$ used to calculate the value of the coefficient K may be the number of resource blocks in the initial DL BWP in the second size starting from the lowest RB that receives the CORESET in the DCI format 1_0.

As an extension of the above example, the terminal apparatus 1 may determine the first size of the initial DL BWP as the size of the DL BWP in the case that the search space set for performing decoding on the DCI format is a common search space set other than the type0-PDCCH common search space set, and the CORESET that establishes an association with the search space set is the CORESET #0. Furthermore, the terminal apparatus 1 determines to generate the RIV by using the first size of the initial DL BWP for the $N^{size}_{BWP}$ in (A) of FIG. 9. The terminal apparatus 1 may determine the resource block allocation in the frequency direction of the PDSCH based on the value of the RIV shown in the frequency domain resource assignment field.

In addition, the terminal apparatus 1 may determine the second size of the initial DL BWP as the size of the DL BWP in the case that the search space set for performing decoding on the DCI format is a common search space set other than the type0-PDCCH common search space set, and the CORESET that establishes an association with the search space set is a common CORESET other than the CORESET #0. Furthermore, the terminal apparatus 1 determines the resource allocation by using the method in (B) of FIG. 9. That is, the $N^{initial}_{BWP}$ in (B) of FIG. 9 is the first size of the initial DL BWP. The $N^{active}_{BWP}$ is the second size of the initial DL BWP. The value of the RIV is given based on the first size $N^{initial}_{BWP}$ representing the initial BWP, the start virtual resource block $RB'_{start}$, and the number $L'_{RBs}$ of consecutively allocated virtual resource blocks. Furthermore, the start virtual resource block $RB_{start}$ of the resource allocation is the coefficient K times the start virtual resource block $RB'_{start}$. The number $L'_{RBs}$ of virtual resource blocks of the resource allocation is the coefficient K times the number $L'_{RBs}$ of virtual resource blocks. Furthermore, the terminal apparatus 1 may determine the resource block allocation in the frequency direction of the PDSCH based on the value of the RIV shown in the frequency domain resource assignment field.

In addition, the terminal apparatus 1 may determine the third size of the active DL BWP as the size of the DL BWP in the case that the search space set for performing decoding on the DCI format is a UE-specific search space set. Furthermore, the terminal apparatus 1 determines to generate the RIV by using the third size of the active DL BWP for the $N^{size}_{BWP}$ in (A) of FIG. 9. The terminal apparatus 1 may determine the resource block allocation in the frequency direction of the PDSCH based on the value of the RIV shown in the frequency domain resource assignment field.

As a solution B of the present implementation manner, the bits in the frequency domain resource assignment field included in the DCI format in the common search space set are deduced as the first size of the initial DL BWP. The resource assignment field (downlink type 1 resource allocation field) is composed of the resource indication value (RIV). The RIV corresponds to a certain start virtual resource block and the number of consecutively allocated virtual resource blocks. In other words, the RIV is defined (calculated) according to the size of the DL BWP, the start virtual resource block of the resource allocation, and the number of consecutively allocated virtual resource blocks.

In the present solution B, the type0-PDCCH common search space set may establish an association with the CORESET #0. Another type of PDCCH common search space set may establish an association with the additional common CORESET. For example, the other type of PDCCH common search space set may be the type0A-PDCCH common search space, the type1-PDCCH common search space, or the type2-PDCCH common search space.

The DL BWP set with the CORESET #0 may be the initial DL BWP in the first size. The DL BWP set with the additional common CORESET may be the initial DL BWP in the second size. The terminal apparatus 1 determines the size of the DL BWP based on which one of the CORESET #0 and the additional common CORESET is the CORESET that establishes an association with the common search space for performing decoding on the DCI format. The terminal apparatus 1 may determine the first size of the initial DL BWP as the size of the DL BWP in the case that the CORESET that establishes an association with the common search space for performing decoding on the DCI format is the CORESET #0. Furthermore, the terminal apparatus 1 determines to generate the RIV by using the first size of the initial DL BWP for the $N^{size}_{BWP}$ in (A) of FIG. 9. In other words, the RIV is given according to the first size of the initial DL BWP, the $RB_{start}$, and the $L_{RBs}$. The terminal apparatus 1 may determine the resource block allocation in the frequency direction of the PDSCH based on the value of the RIV shown in the frequency domain resource assignment field.

In addition, the terminal apparatus 1 may determine the second size of the initial DL BWP as the size of the DL BWP in the case that the CORESET that establishes an association with the common search space for performing decoding on the DCI format is the additional CORESET. Furthermore, the terminal apparatus 1 determines the resource allocation by using the method in (B) of FIG. 9. That is, the $N^{initial}_{BWP}$ in (B) of FIG. 9 is the first size of the initial DL BWP. The $N^{active}_{BWP}$ is the second size of the initial DL BWP. The value of the RIV is given based on the first size $N^{initial}_{BWP}$ representing the initial BWP, the start virtual resource block $RB'_{start}$, and the number $L'_{RBs}$ of consecutively allocated virtual resource blocks. Furthermore, the start virtual resource block $RB_{start}$ of the resource allocation is the coefficient K times the start virtual resource block $RB'_{start}$. The number $L'_{RBs}$ of virtual resource blocks of the resource allocation is the coefficient K times the number $L'_{RBs}$ of virtual resource blocks. Furthermore, the terminal apparatus 1 may determine the resource block allocation in the frequency direction of the PDSCH based on the value of the RIV shown in the frequency domain resource assignment field.

In addition, the terminal apparatus 1 may determine the size of the active DL BWP as the size of the DL BWP in the case that the search space for performing decoding on the DCI format is the UE-specific search space. That is, the DL BWP to which the resource assignment is applied is the active DL BWP. Furthermore, the terminal apparatus 1 determines to generate the RIV by using the size of the active DL BWP for the $N^{size}_{BWP}$ in (A) of FIG. 9. In other words, the RIV is given according to the size of the active DL BWP, the $RB_{start}$, and the $L_{RBs}$. The terminal apparatus 1 may determine the resource block allocation in the frequency direction of the PDSCH based on the value of the RIV shown in the frequency domain resource assignment field.

As a solution C of the present implementation manner, the bits in the frequency domain resource assignment field included in the DCI format in the common search space set are deduced as the first size of the initial DL BWP. The resource assignment field (downlink type 1 resource allocation field) is composed of the resource indication value (RIV). The RIV corresponds to a certain start virtual resource block and the number of consecutively allocated virtual resource blocks. In other words, the RIV is defined (calculated) according to the size of the DL BWP, the start virtual resource block of the resource allocation, and the number of consecutively allocated virtual resource blocks.

In the present solution C, the type0-PDCCH common search space set may establish an association with the CORESET #0. Another type of PDCCH common search space set may establish an association with the CORESET #0. For example, the other type of PDCCH common search space set may be the type0A-PDCCH common search space, the type1-PDCCH common search space, or the type2-PDCCH common search space.

The DL BWP set with the CORESET #0 may be the initial DL BWP in the first size. The terminal apparatus 1 determines the size of the DL BWP based on whether the common search space for performing decoding on the DCI format is the type0-PDCCH common search space set. The terminal apparatus 1 may determine the first size of the initial DL BWP as the size of the DL BWP in the case that the common search space for performing decoding on the DCI format is the type0-PDCCH common search space set. Furthermore, the terminal apparatus 1 determines to generate the RIV by using the first size of the initial DL BWP for the $N^{size}_{BWP}$ in (A) of FIG. 9. In other words, the RIV is given according to the first size of the initial DL BWP, the $RB_{start}$, and the $L_{RBs}$. The terminal apparatus 1 may determine the resource block allocation in the frequency direction of the PDSCH based on the value of the RIV shown in the frequency domain resource assignment field.

For example, the terminal apparatus 1 may determine the second size of the initial DL BWP as the size of the DL BWP in the case that the common search space set for performing decoding on the DCI format is a common search space other than the type0-PDCCH common search space. Furthermore, the terminal apparatus 1 determines the resource allocation by using the method in (B) of FIG. 9. That is, the $N^{initial}_{BWP}$ in (B) of FIG. 9 is the first size of the initial DL BWP. The $N^{active}_{BWP}$ is the second size of the initial DL BWP. The value of the RIV is given based on the first size $N^{initial}_{BWP}$ representing the initial BWP, the start virtual resource block $RB'_{start}$, and the number $L'_{RBs}$ of consecutively allocated virtual resource blocks. Furthermore, the start virtual resource block $RB_{start}$ of the resource allocation is the coefficient K times the start virtual resource block $RB'_{start}$. The number $L'_{RBs}$ of virtual resource blocks of the resource allocation is the coefficient K times the number $L'_{RBs}$ of virtual resource blocks. Furthermore, the terminal apparatus 1 may determine the resource block allocation in the frequency direction of the PDSCH based on the value of the RIV shown in the frequency domain resource assignment field.

In addition, as an extension of the above example, the terminal apparatus 1 may determine the first size of the initial DL BWP as the size of the DL BWP in the case that the common search space for performing decoding on the DCI format is the type0A-PDCCH common search space set. Furthermore, the terminal apparatus 1 determines to generate the RIV by using the first size of the initial DL BWP for the $N^{size}_{BWP}$ in (A) of FIG. 9. In other words, the RIV is given according to the first size of the initial DL BWP, the $RB_{start}$, and the $L_{RBs}$. The terminal apparatus 1 may determine the resource block allocation in the frequency direction of the PDSCH based on the value of the RIV shown in the frequency domain resource assignment field.

For example, the terminal apparatus 1 may determine the second size of the initial DL BWP as the size of the DL BWP in the case that the common search space set for performing decoding on the DCI format is the type1-PDCCH common search space or the type2-PDCCH common search space set. Furthermore, the terminal apparatus 1 determines the resource allocation by using the method in (B) of FIG. 9. That is, the $N^{initial}_{BWP}$ in (B) of FIG. 9 is the first size of the initial DL BWP. The $N^{active}_{BWP}$ is the second size of the initial DL BWP. The value of the RIV is given based on the first size $N^{initial}_{BWP}$ representing the initial BWP, the start virtual resource block $RB'_{start}$, and the number $L'_{RBs}$ of consecutively allocated virtual resource blocks. Furthermore, the start virtual resource block $RB_{start}$ of the resource allocation is the coefficient K times the start virtual resource block $RB'_{start}$. The number $L'_{RBs}$ of virtual resource blocks of the resource allocation is the coefficient K times the number $L'_{RBs}$ of virtual resource blocks. Furthermore, the terminal apparatus 1 may determine the resource block allocation in the frequency direction of the PDSCH based on the value of the RIV shown in the frequency domain resource assignment field.

As the solution D of the present implementation manner, the terminal apparatus 1 determines, in the search space set, the number of bits in the frequency domain resource assignment field included in the DCI format. The number of bits in the frequency domain resource assignment field is deduced from the (Equation 4) Ceiling($\log_2(N^{DL,BWP}_{RB} (N^{DL,BWP}_{RB}+1)/2)$). The frequency domain resource assignment field (downlink type 1 resource allocation field) includes the resource indication value (RIV). The RIV corresponds to a certain start virtual resource block and the number of consecutively allocated virtual resource blocks. In other words, the RIV is defined (calculated) according to the size of the DL BWP, the start virtual resource block of the resource allocation, and the number of consecutively allocated virtual resource blocks.

In the present solution D, the number of bits in the frequency domain resource assignment field may be deduced according to any one of the first size of the initial DL BWP or the second size of the initial DL BWP based on (1) whether the search space set for performing decoding on the DCI format is the type0-PDCCH common search space set and/or (2) whether the CORESET that establishes an association with the search space for performing decoding on the DCI format is the CORESET #0.

In the case that the search space set is the type0-PDCCH common search space set, the number of bits in the frequency domain resource assignment field may be deduced according to the first size of the initial DL BWP. In other words, the $N^{DL,BWP}_{RB}$ in the Equation (4) is the first size of the initial DL BWP. Furthermore, the terminal apparatus 1 determines to generate the RIV by using the first size of the initial DL BWP for the $N^{size}_{BWP}$ in (A) of FIG. 9. The RIV is given according to the first size of the initial DL BWP, the start virtual resource block $RB_{start}$ of the resource allocation, and the number $L_{RBs}$ of consecutively allocated virtual resource blocks. The terminal apparatus 1 may determine the resource block allocation in the frequency direction of the PDSCH based on the value of the RIV shown in the frequency domain resource assignment field.

In the case that the search space set is a common search space set other than the type0-PDCCH common search space set, and the CORESET that establishes an association with the search space set is the CORESET #0, the number of bits in the frequency domain resource assignment field may be deduced according to the first size of the initial DL BWP. In other words, the $N^{DL,BWP}_{RB}$ in the Equation (4) is the first size of the initial DL BWP. Furthermore, the terminal apparatus 1 determines to generate the RIV by using the first size of the initial DL BWP for the $N^{size}_{BWP}$ in (A) of FIG. 9. The RIV is given according to the first size of the initial DL BWP, the start virtual resource block $RB_{start}$ of the resource allocation, and the number $L_{RBs}$ of consecutively allocated virtual resource blocks. The terminal apparatus 1 may determine the resource block allocation in the frequency direction of the PDSCH based on the value of the RIV shown in the frequency domain resource assignment field.

In the case that the search space set is a common search space set other than the type0-PDCCH common search space set, and the CORESET that establishes an association with the search space set is a common CORESET other than the CORESET #0, the number of bits in the frequency domain resource assignment field may be deduced according to the second size of the initial DL BWP. Here, a common CORESET is set for the initial DL BWP. In other words, the $N^{DL, BWP}_{RB}$ in the Equation (4) is the first size of the initial DL BWP. Furthermore, the terminal apparatus 1 determines to generate the RIV by using the first size of the initial DL BWP for the $N^{size}_{BWP}$ in (A) of FIG. 9. The RIV is given according to the first size of the initial DL BWP, the start virtual resource block $RB_{start}$ of the resource allocation, and the number $L_{RBs}$ of consecutively allocated virtual resource blocks. The terminal apparatus 1 may determine the resource block allocation in the frequency direction of the PDSCH based on the value of the RIV shown in the frequency domain resource assignment field.

In this way, the terminal apparatus 1 performing the random access procedure can perform uplink data transmission to the base station apparatus 3.

The configuration of the apparatus of the present implementation manner will be described below.

Figure 10:
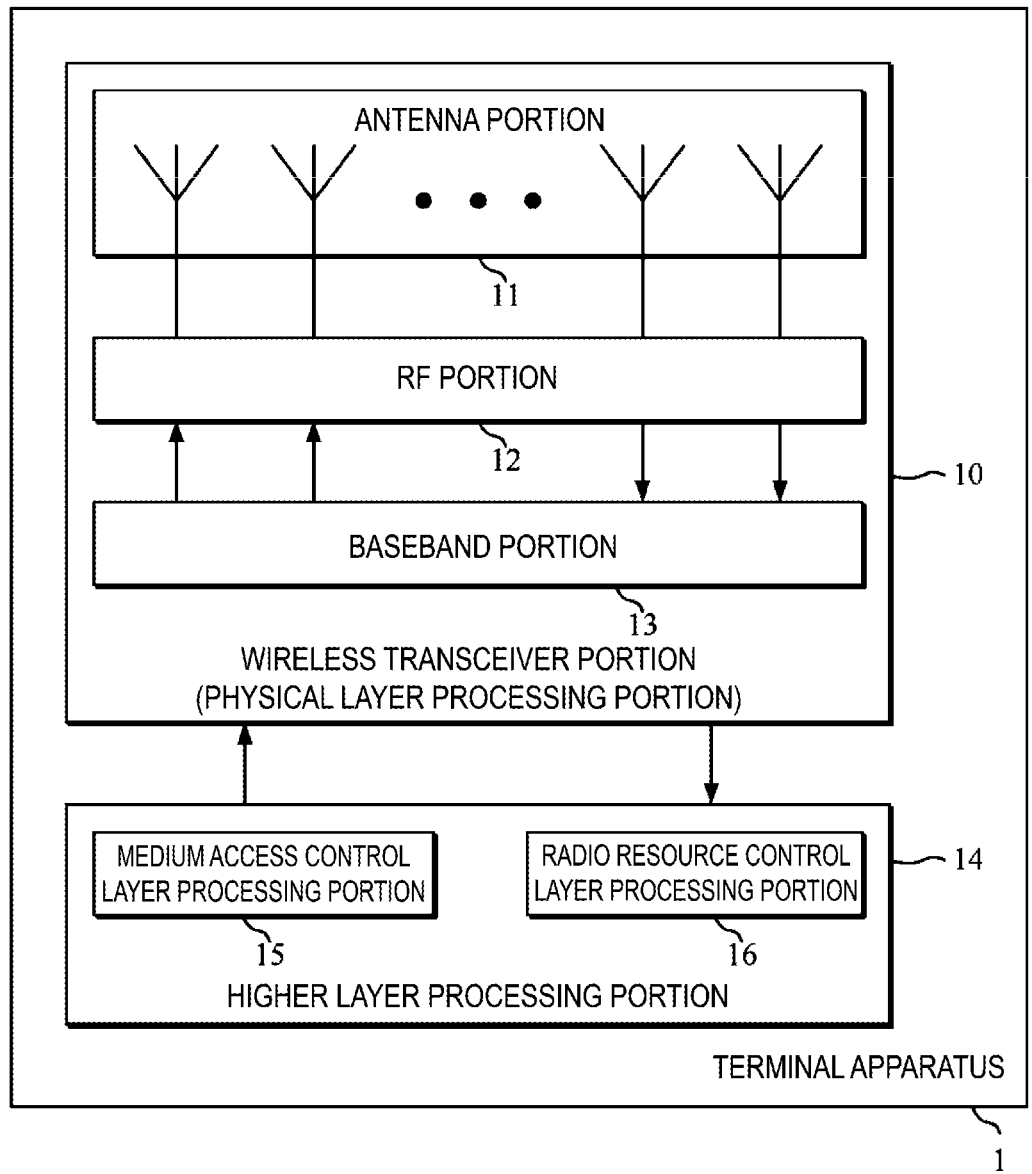
FIG. 10 is a schematic block diagram showing a configuration of a terminal apparatus 1 according to an implementation manner of the present invention.

FIG. 10 is a schematic block diagram showing the configuration of a terminal apparatus 1 according to the present implementation manner. As shown in FIG. 10, the terminal apparatus 1 is configured to include a wireless transceiver portion 10 and a higher layer processing portion 14. The wireless transceiver portion 10 is configured to include an antenna portion 11, a radio frequency (RF) portion 12, and a baseband portion 13. The higher layer processing portion 14 is configured to include a medium access control layer processing portion 15 and a radio resource control layer processing portion 16. The wireless transceiver portion 10 is also referred to as a transmitting portion, receiving portion, monitoring portion, or physical layer processing portion. The higher layer processing portion 14 is also referred to as a measurement portion, selection portion, or control portion 14.

The higher layer processing portion 14 outputs uplink data (which may also be referred to as a transport block) generated by an operation or the like of a user to the wireless transceiver portion 10. The higher layer processing portion 14 performs part or all of processing in a medium access control (MAC) layer, Packet Data Convergence Protocol (PDCP) layer, a Radio Link Control (RLC) layer, and a Radio Resource Control (RRC) layer. The higher layer processing portion 14 may have a function of selecting one reference signal from one or a plurality of reference signals based on measured values of various reference signals. The higher layer processing portion 14 may also have a function of selecting, from one or a plurality of PRACH occasions, one PRACH occasion that establishes an association with the selected reference signal. The higher layer processing portion 14 may have a function of determining an index from one or a plurality of indexes set by the higher layer (for example, the RRC layer) and setting it as a preamble index in the case that bit information included in information indicating the start of the random access procedure received by the wireless transceiver portion 10 is a specified value. The higher layer processing portion 14 may have a function of determining an index that establishes an association with the selected reference signal from one or a plurality of indexes set by the RRC, and setting it as a preamble index. The higher layer processing portion 14 may have a function of determining a next available PRACH occasion based on the received information (for example, SSB index information and/or mask index information). The higher layer processing portion 14 may have a function of selecting an SS/PBCH block based on the received information (for example, the SSB index information).

The medium access control layer processing portion 15 included in the higher layer processing portion 14 performs MAC layer (medium access control layer) processing. The medium access control layer processing portion 15 performs control on transport of a scheduling request based on various types of setting information/parameters managed by the radio resource control layer processing portion 16.

The radio resource control layer processing portion 16 included in the higher layer processing portion 14 performs RRC layer (radio resource control layer) processing. The radio resource control layer processing portion 16 manages various types of setting information/parameters of the apparatus itself. The radio resource control layer processing portion 16 sets the various types of setting information/parameters based on higher layer signaling received from the base station apparatus 3. That is, the radio resource control layer processing portion 16 sets the various types of setting information/parameters based on information representing the various types of setting information/parameters received from the base station apparatus 3. The radio resource control layer processing portion 16 controls (determines) resource allocation based on downlink control information received from the base station apparatus 3.

The wireless transceiver portion 10 performs physical layer processing such as modulation, demodulation, encoding, and decoding. The wireless transceiver portion 10 performs separation, demodulation, and decoding on the signal received from the base station apparatus 3, and outputs information after the decoding to the higher layer processing portion 14. The wireless transceiver portion 10 generates a transmission signal by performing modulation and encoding on data, and transmits the signal to the base station apparatus 3. The wireless transceiver portion 10 may have a function of receiving one or a plurality of reference signals in a certain cell. The wireless transceiver portion 10 may have a function of receiving information (for example, the SSB index information and/or mask index information) that determines one or a plurality of PRACH occasions. The wireless transceiver portion 10 may have a function of receiving a signal including indication information indicating the start of a random access procedure. The wireless transceiver portion 10 may also have a function of receiving information of performing reception on information that determines a specified index. The wireless transceiver portion 10 may have a function of receiving information that determines an index of a random access preamble. The wireless transceiver portion 10 may also have a function of transmitting the random access preamble through the PRACH occasion determined by the higher layer processing portion 14.

The RF portion 12 converts (down converts) the signal received via the antenna portion 11 into a baseband signal by orthogonal demodulation, and removes unnecessary frequency components. The RF portion 12 outputs a processed analog signal to the baseband portion.

The baseband portion 13 converts the analog signal input from the RF portion 12 into a digital signal. The baseband portion 13 removes a part equivalent to a Cyclic Prefix (CP) from the converted digital signal, performs Fast Fourier Transform (FFT) on the CP-removed signal, and extracts a signal in the frequency domain.

The baseband portion 13 performs Inverse Fast Fourier Transform (IFFT) on the data, generates an OFDM symbol, adds the CP to the generated OFDM symbol to generate a baseband digital signal, and converts the baseband digital signals into an analog signal. The baseband portion 13 outputs the converted analog signal to the RF portion 12.

The RF portion 12 uses a low-pass filter to remove unnecessary frequency components from the analog signal input from the baseband portion 13, up-converts the analog signal to a carrier frequency, and transmits it via the antenna portion 11. In addition, the RF portion 12 amplifies the power. In addition, the RF portion 12 may also have a function of determining a transmission power of an uplink signal and/or uplink channel transmitted in a cell in the area. The RF portion 12 is also referred to as a transmission power control portion.

Figure 11:
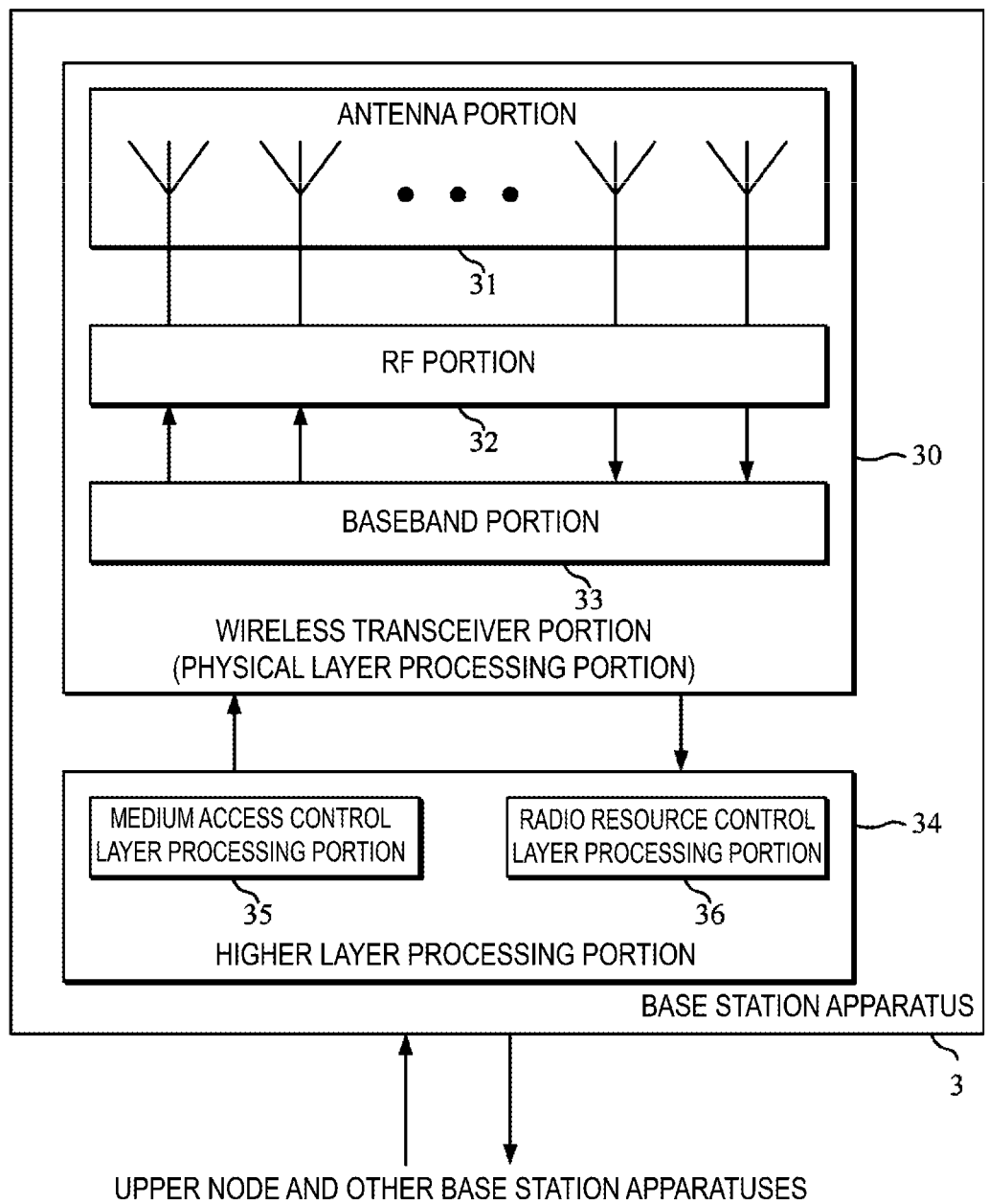
FIG. 11 is a schematic block diagram showing a configuration of a base station apparatus 3 according to an implementation manner of the present invention.

FIG. 11 is a schematic block diagram showing the configuration of a base station apparatus 3 according to the present implementation manner. As shown in FIG. 11, the base station apparatus 3 is configured to include a wireless transceiver portion 30 and a higher layer processing portion 34. The wireless transceiver portion 30 is configured to include an antenna portion 31, an RF portion 32, and a baseband portion 33. The higher layer processing portion 34 is configured to include a medium access control layer processing portion 35 and a radio resource control layer processing portion 36. The wireless transceiver portion 30 is also referred to as a transmitting portion, receiving portion, monitoring portion, or physical layer processing portion. In addition, a control portion that controls actions of various portions based on various conditions is further provided. The higher layer processing portion 34 is also referred to as a control portion 34.

The higher layer processing portion 34 performs part or all of processing in a medium access control (MAC) layer, packet data convergence protocol (PDCP) layer, radio link control (RLC) layer, and radio resource control (RRC) layer. The higher layer processing portion 34 may have a function of determining one reference signal from one or a plurality of reference signals based on a random access preamble received by the wireless transceiver portion 30. The higher layer processing portion 34 may determine, based on at least SSB index information and mask index information, a PRACH occasion for monitoring the random access preamble.

The medium access control layer processing portion 35 included in the higher layer processing portion 34 performs MAC layer processing. The medium access control layer processing portion 35 performs processing related to a scheduling request based on various types of setting information/parameters managed by the radio resource control layer processing portion 36.

The radio resource control layer processing portion 36 included in the higher layer processing portion 34 performs RRC layer processing. The radio resource control layer processing portion 36 generates downlink control information (uplink grant and downlink grant) including resource allocation information in the terminal apparatus 1. The radio resource control layer processing portion 36 generates or acquires, from an upper node, downlink control information, downlink data (a transport block and a random access response) configured on a physical downlink shared channel, system information, a RRC message, a MAC Control Element (CE), and the like, and outputs them to the wireless transceiver portion 30. In addition, the radio resource control layer processing portion 36 manages various types of setting information/parameters of various terminal apparatuses 1. The radio resource control layer processing portion 36 may set various types of setting information/parameters for various terminal apparatuses 1 via higher layer signaling. That is, the radio resource control layer processing portion 36 transmits/broadcasts information indicating the various types of setting information/parameters. The radio resource control layer processing portion 36 may transmit/broadcast information for determining setting of one or a plurality of reference signals in a certain cell.

In the case that an RRC message, a MAC CE, and/or a PDCCH is transmitted from the base station apparatus 3 to the terminal apparatus 1, and the terminal apparatus 1 performs processing based on the reception, the base station apparatus 3 performs processing (control on the terminal apparatus 1 and the system) on the assumption that the terminal apparatus performs the processing. That is, the base station apparatus 3 transmits the RRC message, MAC CE, and/or PDCCH to the terminal apparatus 1 so that the terminal apparatus performs processing based on the reception.

The wireless transceiver portion 30 has a function of transmitting one or a plurality of reference signals. In addition, the wireless transceiver portion 30 may have a function of receiving a signal including a beam failure recovery request transmitted from the terminal apparatus 1. The wireless transceiver portion 30 may have a function of transmitting information (for example, SSB index information and/or mask index information) that determines one or a plurality of PRACH occasions to the terminal apparatus 1. The wireless transceiver portion 30 may also have a function of transmitting information that determines a specified index. The wireless transceiver portion 30 may also have a function of transmitting information that determines an index of a random access preamble. The wireless transceiver portion 30 may have a function of monitoring the random access preamble through the PRACH occasion determined by the higher layer processing portion 34. In addition, some functions of the wireless transceiver portion 30 are the same as those of the wireless transceiver portion 10, and therefore the description is omitted. It should be noted that in the case that the base station apparatus 3 is connected to one or a plurality of transmission and reception points 4, some or all of the functions of the wireless transceiver portion 30 may be included in each transmission and reception point 4.

In addition, the higher layer processing portion 34 performs transmission (delivering) or reception of a control message or user data between the base station apparatuses 3 or between a higher layer network apparatus (an MME or an SGW (Serving-GW)) and the base station apparatus 3. In FIG. 11, other configuration elements of the base station apparatus 3 and transmission paths of data (control information) between the configuration elements are omitted, but it is obvious that a plurality of blocks having other functions necessary for the operation of the base station apparatus 3 are included and regarded as the configuration elements. For example, the higher layer processing portion 34 includes a Radio Resource Management (RRM) layer processing portion and an application program layer processing portion. In addition, the higher layer processing portion 34 may also have a function of configuring a plurality of scheduling request resources corresponding to each of the plurality of reference signals transmitted from the wireless transceiver portion 30.

It should be noted that the "portions" in the drawings refer to the elements that are represented through components, circuits, configuration apparatuses, device, and units, for realizing the functions of the terminal apparatus 1 and the base station apparatus 3 and various procedures.

The portions labeled with reference numerals 10 to 16 included in the terminal apparatus 1 may be configured as circuits. The portions labeled with reference numerals 30 to 36 included in the base station apparatus 3 may also be configured as circuits.

(1) More specifically, a terminal apparatus 1 according to the first solution of the present invention includes: a receiving portion 10 configured to receive, in a search space set in a certain control resource set, a downlink DCI format including a first field representing a frequency domain resource assignment; and a control portion 16 configured to determine resource allocation of a PDSCH based on the frequency domain resource assignment, wherein a first size of an initial DL BWP is the number of consecutive resource blocks for a CORESET #0 determined according to controlResourceSetZero, a second size of the initial DL BWP is the number of resource blocks of a BWP indicated by SIB1 (SystemInformationBlockType1) or ServingCellConfigCommon, the number of bits in the first field is deduced according to the first size of the initial DL BWP, the frequency domain resource assignment includes an RIV, the RIV is given according to the size of a DL BWP, a first start virtual resource block of the resource allocation, and the number of consecutively allocated first virtual resource blocks, which one of the first size, the second size, and a third size of an active DL BWP is the size of the DL BWP is given based on (1) whether the search space set is a type0-PDCCH common search space set and/or (2) whether the control resource set is the CORESET #0, the type0-PDCCH common search space set is set according to searchSpaceZero or searchspaceSIB1, and the CORESET #0 is a control resource set determined by an identifier 0 of a CORESET.

(2) A base station apparatus 3 according to the second solution of the present invention includes: a control portion 36 configured to generate a first field representing a frequency domain resource assignment of resource allocation information of a PDSCH; and a transmission portion 30 configured to transmit, in a search space set in a certain control resource set, a downlink DCI format including the first field, wherein a first size of an initial DL BWP is the number of consecutive resource blocks for a CORESET #0 determined according to controlResourceSetZero, a second size of the initial DL BWP is the number of resource blocks of a BWP indicated by SIB1 (SystemInformationBlockType1) or ServingCellConfigCommon, the number of bits in the first field is deduced according to the first size of the initial DL BWP, the frequency domain resource assignment includes an RIV, the RIV is given according to the size of a DL BWP, a first start virtual resource block of the resource allocation, and the number of consecutively allocated first virtual resource blocks, which one of the first size, the second size, and a third size of an active DL BWP is the size of the DL BWP is given based on (1) whether the search space set is a type0-PDCCH common search space set and/or (2) whether the control resource set is the CORESET #0, the type0-PDCCH common search space set is set according to searchSpaceZero or searchspaceSIB1, and the CORESET #0 is a control resource set determined by an identifier 0 of a CORESET.

(3) In the first and second solutions of the present invention, in the case that the search space set is the type0-PDCCH common search space set, the size of the DL BWP is the first size, and the RIV is given according to the first size, the first start virtual resource block, and the number of the first virtual resource blocks.

(4) In the first and second solutions of the present invention, in the case that the search space set is a common search space set other than the type0-PDCCH common search space set, and the control resource set is the CORESET #0, the size of the DL BWP is the first size, and the RIV is given according to the first size, the first start virtual resource block, and the number of the first virtual resource blocks.

(5) In the first and second solutions of the present invention, in the case that the search space set is a common search space set other than the type0-PDCCH common search space set, and the control resource set is a common CORESET other than the CORESET #0, the size of the DL BWP is the second size, the RIV is given according to the first size, a second start virtual resource block, and the number of second virtual resource blocks, the first start virtual resource block is a coefficient K times the second start virtual resource block, and the number of the first virtual resource blocks is the coefficient K times the number of the second virtual resource blocks.

(6) In the first and second solutions of the present invention, in the case that the second size is greater than the first size, the coefficient K is given as a value of a ratio of the second size to the first size that is rounded to be closest to the power of 2, and in other cases, it is given as 1.

(7) In the first and second solutions of the present invention, in the case that the search space set is a UE-specific search space set, the size of the DL BWP is the third size, and the RIV is given according to the third size, the first start virtual resource block, and the number of the first virtual resource blocks.

(8) A terminal apparatus 1 according to the third solution of the present invention includes a receiving portion 10 configured to receive, in a search space set in a certain control resource set (CORESET), a downlink DCI format including a first field representing a frequency domain resource assignment; and a control portion 16 configured to determine resource allocation of a PDSCH based on the frequency domain resource assignment, wherein the number of bits in the first field is deduced according to a first size of an initial DL BWP or a second size of the initial DL BWP based on (1) whether the common search space set is a type0-PDCCH common search space set and/or (2) whether the control resource set is a CORESET #0, the CORESET #0 is a control resource set determined by an identifier 0 of the CORESET, the first size is the number of consecutive resource blocks for the CORESET #0 determined according to controlResourceSetZero, the second size is the number of second resource blocks of a BWP indicated by SIB1 (SystemInformationBlockType1) or ServingCellConfigCommon, the frequency domain resource assignment includes a resource indication value (RIV), and the RIV corresponds, based on any one of the first size, the second size, and a third size of an active DL BWP, to a first start virtual resource block of the resource allocation and the number of consecutively allocated first virtual resource blocks.

(9) A base station apparatus 3 that performs communication with a terminal apparatus 1 according to the fourth solution of the present invention includes: a transmitting portion 30 configured to transmit, in a search space set in a certain control resource set (CORESET), a downlink DCI format including a first field representing a frequency domain resource assignment; and a control portion 36 configured to generate the frequency domain resource assignment indicating resource allocation for the terminal apparatus 1, wherein the number of bits in the first field is deduced according to a first size of an initial DL BWP or a second size of the initial DL BWP based on (1) whether the common search space set is a type0-PDCCH common search space set and/or (2) whether the control resource set is a CORESET #0, the CORESET #0 is a control resource set determined by an identifier 0 of the CORESET, the first size is the number of consecutive resource blocks for the CORESET #0 determined according to controlResourceSetZero, the second size is the number of second resource blocks of a BWP indicated by SIB1 (SystemInformationBlockType1) or ServingCellConfigCommon, the frequency domain resource assignment includes a resource indication value (RIV), and the RIV corresponds, based on any one of the first size, the second size, and a third size of an active DL BWP, to a first start virtual resource block of the resource allocation and the number of consecutively allocated first virtual resource blocks.

(10) In the third and fourth solutions of the present invention, in the case that the search space set is the type0-PDCCH common search space set, the number of bits in the first field is deduced according to the first size, and the RIV is given according to the first size, the first start virtual resource block, and the number of the first virtual resource blocks.

(11) In the third and fourth solutions of the present invention, in the case that the search space set is a common search space set other than the type0-PDCCH common search space set, and the control resource set is the CORESET #0, the number of bits in the first field is deduced according to the first size, and the RIV is given according to the first size, the first start virtual resource block, and the number of the first virtual resource blocks.

(12) In the third and fourth solutions of the present invention, in the case that the search space set is a common search space set other than the type0-PDCCH common search space set, and the control resource set is a common search space set other than the CORESET #0, the number of bits in the first field is deduced according to the second size, the common CORESET is set for the initial DL BWP, and the RIV is given according to the second size, the first start virtual resource block, and the number of the first virtual resource blocks.

(13) In the third and fourth solutions of the present invention, in the case that the search space set is a UE-specific search space set, the number of bits in the first field is deduced according to the third size, and the RIV is given according to the third size, the first start virtual resource block, and the number of the first virtual resource blocks.

Therefore, the terminal apparatus 1 can perform communication with the base station apparatus 3 efficiently.

The program operating in the apparatus involved in the present invention may be a program that controls a central processing unit (CPU) and the like to make a computer function in order to realize the functions of the implementation manners involved in the present invention. The program or the information processed by the program is temporarily stored in a volatile memory such as a random access memory (RAM), a non-volatile memory such as a flash memory, a hard disk drive (HDD), or another storage apparatus system.

It should be noted that a program for realizing the functions of the implementation manners of the present invention may also be recorded in a computer-readable recording medium. This can be achieved by reading the program recorded in the recording medium into a computer system for execution. The "computer system" mentioned here refers to a computer system built in the apparatus, and includes an operating system, peripherals, and other hardware. In addition, the "computer-readable recording medium" may be a semiconductor recording medium, an optical recording medium, a magnetic recording medium, a medium that dynamically saves a program for a short time, or another computer-readable recording medium.

In addition, various functional blocks or various features of the apparatus used in the above implementation manners may be installed or executed by an electronic circuit such as an integrated circuit or a plurality of integrated circuits. Circuits designed to perform the functions described in the present specification may include a general-purpose processor, a digital signal processor (DSP), an application-specific integrated circuit (ASIC), a field programmable gate array (FPGA) or another programmable logic element, a discrete gate or transistor logic, a discrete hardware part, or a combination of them. The general-purpose processor may be a microprocessor, or an existing type of processor, controller, microcontroller, or state machine. The above electronic circuit may be composed of a digital circuit or an analog circuit. In addition, in the case of an integrated circuit technology replacing the existing integrated circuit with the advancement of the semiconductor technology, one or a plurality of solutions of the present invention may also use a new integrated circuit based on this technology.

It should be noted that, in the implementation manners of the present invention, an example applicable to a communication system composed of a base station apparatus and a terminal apparatus is described, but it is also applicable to a system, such as a Device to Device (D2D), in which terminals perform communication with each other.

It should be noted that the invention of the present application is not limited to the above implementation manners. In the implementation manner, an example of the apparatus is described, but the invention of the present application is not limited to this, and can be applied to a fixed or non-movable electronic device arranged indoors and outdoors, for example, a terminal apparatus or communication apparatus such as an AV device, a kitchen device, a cleaning/washing device, an air-conditioning device, an office device, a vending machine, and other living devices.

As described above, the implementation manners of the present invention have been described in detail with reference to the accompanying drawings, but the specific configuration is not limited to the present implementation manner, and includes design variations that do not depart from the scope of the spirit of the present invention. In addition, various variations can be made for the present invention within the scope shown in the technical solutions, and implementation manners obtained by appropriately combining the technical solutions disclosed in different implementation manners are also included in the technical scope of the present invention. In addition, a configuration obtained by replacing the elements described in the above implementation manners and elements having the same effects with each other is also included.

What is claimed is:

1. A terminal apparatus comprising:
a receiving portion configured to
receive a setting of an initial downlink (DL) bandwidth part (BWP) via a radio resource control (RRC) message, and
receive a downlink control information (DCI) format that schedules a physical downlink shared channel (PDSCH) in an active DL BWP; and
a control portion configured to identify, in a field in the DCI format, a value corresponding to a resource block set to which the PDSCH is allocated and which is indicated by a start resource block and a number of consecutively allocated resource blocks, wherein
the setting of the initial DL BWP comprises setting a first parameter and a second parameter of a control resource set (CORESET) #0,
a value of an identifier of the CORESET #0 is 0,
the first parameter represents a size of the CORESET #0,
the second parameter represents a size of the initial DL BWP,
a serving cell is set with the initial DL BWP and an additional DL BWP,
one of the initial DL BWP and the additional DL BWP is activated as the active DL BWP,
the value identified by the control portion is determined based on a size of a DL BWP, the start resource block, and the number of the consecutively allocated resource blocks,
a size of the DCI format in a common search space (CSS) is determined based on the size of the CORESET #0, and when the field in the DCI format is applied to the active DL BWP, the size of the DL BWP is the size of the CORESET #0, and
a size of the DCI format in a user equipment (UE)-specific search space (USS) is determined based on a size of the active DL BWP, and when the field in the DCI format is applied to the active DL BWP, the size of the DL BWP is the size of the active DL BWP.

2. The terminal apparatus according to claim 1, wherein the value identified by the control portion is further determined based on a first value,
when the size of the active DL BWP is greater than the size of the CORESET #0, the first value is determined based on the size of the active DL BWP and the size of the CORESET #0, and
when the size of the active DL BWP is less than the size of the CORESET #0, the first value is 1.

3. The terminal apparatus according to claim 1, wherein the initial DL BWP is activated as the active DL BWP, and the size of the active DL BWP is the size of the initial DL BWP.

4. The terminal apparatus according to claim 1, wherein the setting of the first parameter of the CORESET #0 does not comprise a setting of a BWP other than the initial DL BWP,
a field of the first parameter is 4 bits, and
the initial DL BWP comprises the CORESET #0 in a frequency domain.

5. A base station apparatus comprising:
a transmitting portion configured to
transmit a setting of an initial downlink (DL) bandwidth part (BWP) via a radio resource control (RRC) message, and
transmit a downlink control information (DCI) format that schedules a physical downlink shared channel (PDSCH) in an active DL BWP; and
a control portion configured to set, in a field in the DCI format, a value corresponding to a resource block set to which the PDSCH is allocated and which is indicated by a start resource block and a number of consecutively allocated resource blocks, wherein
the setting of the initial DL BWP comprises setting a first parameter and a second parameter of a control resource set (CORESET) #0,
a value of an identifier of the CORESET #0 is 0,
the first parameter represents a size of the CORESET #0,
the second parameter represents a size of the initial DL BWP,
a serving cell is set with the initial DL BWP and an additional DL BWP,
one of the initial DL BWP and the additional DL BWP is activated as the active DL BWP,
the value set by the control portion is determined based on a size of a DL BWP, the start resource block, and the number of the consecutively allocated resource blocks,
a size of the DCI format in a common search space (CSS) is determined based on the size of the CORESET #0, and when the field in the DCI format is applied to the active DL BWP, the size of the DL BWP is the size of the CORESET #0, and
a size of the DCI format in a user equipment (UE)-specific search space (USS) is determined based on a size of the active DL BWP, and when the field in the DCI format is applied to the active DL BWP, the size of the DL BWP is the size of the active DL BWP.

6. The base station apparatus according to claim 5, wherein
the value set by the control portion is further determined based on a first value,
when the size of the active DL BWP is greater than the size of the CORESET #0, the first value is determined based on the size of the active DL BWP and the size of the CORESET #0, and
when the size of the active DL BWP is less than the size of the CORESET #0, the first value is 1.

7. The base station apparatus according to claim 5, wherein
the initial DL BWP is activated as the active DL BWP, and
the size of the active DL BWP is the size of the initial DL BWP.

8. The base station apparatus according to claim 5, wherein
the setting of the first parameter of the CORESET #0 does not comprise a setting of a BWP other than the initial DL BWP,
a field of the first parameter is 4 bits, and
the initial DL BWP comprises the CORESET #0 in a frequency domain.

9. A communication method for a terminal apparatus, the communication method comprising:
receiving a setting of an initial downlink (DL) bandwidth part (BWP) via a radio resource control (RRC) message;
receiving a downlink control information (DCI) format that schedules a physical downlink shared channel (PDSCH) in an active DL BWP; and
identifying, in a field in the DCI format, a value corresponding to a resource block set to which the PDSCH is allocated and which is indicated by a start resource block and a number of consecutively allocated resource blocks, wherein
the setting of the initial DL BWP comprises setting a first parameter and a second parameter of a control resource set (CORESET) #0,
a value of an identifier of the CORESET #0 is 0,
the first parameter represents a size of the CORESET #0,
the second parameter represents a size of the initial DL BWP,
a serving cell is set with the initial DL BWP and an additional DL BWP,
one of the initial DL BWP and the additional DL BWP is activated as the active DL BWP,
the identified value is determined based on a size of a DL BWP, the start resource block, and the number of the consecutively allocated resource blocks,
a size of the DCI format in a common search space (CSS) is determined based on the size of the CORESET #0, and when the field in the DCI format is applied to the active DL BWP, the size of the DL BWP is the size of the CORESET #0, and
a size of the DCI format in a user equipment (UE)-specific search space (USS) is determined based on a size of the active DL BWP, and when the field in the DCI format is applied to the active DL BWP, the size of the DL BWP is the size of the active DL BWP.

10. The communication method according to claim 9, wherein
the identified value is further determined based on a first value,
when the size of the active DL BWP is greater than the size of the CORESET #0, the first value is determined based on the size of the active DL BWP and the size of the CORESET #0, and
when the size of the active DL BWP is less than the size of the CORESET #0, the first value is 1.

11. The communication method according to claim 9, wherein
the initial DL BWP is activated as the active DL BWP, and the size of the active DL BWP is the size of the initial DL BWP.

12. The communication method according to claim 9, wherein
setting the first parameter of the CORESET #0 does not comprise a setting of a BWP other than the initial DL BWP,
a field of the first parameter is 4 bits, and
the initial DL BWP comprises the CORESET #0 in a frequency domain.

* * * * *